United States Patent
Aritake et al.

(10) Patent No.: US 8,047,721 B2
(45) Date of Patent: Nov. 1, 2011

(54) WHEEL BEARING APPARATUS FOR A VEHICLE

(75) Inventors: Yasuhiro Aritake, Iwata (JP); Naoshi Hattori, Iwata (JP)

(73) Assignee: NTN Corporation (JP)

( * ) Notice: Subject to any disclaimer, the term of this patent is extended or adjusted under 35 U.S.C. 154(b) by 300 days.

(21) Appl. No.: 12/417,829

(22) Filed: Apr. 3, 2009

(65) Prior Publication Data

US 2009/0257698 A1    Oct. 15, 2009

Related U.S. Application Data

(63) Continuation of application No. PCT/JP2007/001019, filed on Sep. 20, 2007.

(30) Foreign Application Priority Data

| Oct. 6, 2006 | (JP) | 2006-274712 |
| Oct. 6, 2006 | (JP) | 2006-274713 |
| Dec. 27, 2006 | (JP) | 2006-351741 |

(51) Int. Cl.
*F16C 33/78* (2006.01)
(52) U.S. Cl. .......... 384/544; 384/477; 384/485
(58) Field of Classification Search .......... 384/477, 384/481, 482, 484, 485, 486, 544
See application file for complete search history.

(56) References Cited

U.S. PATENT DOCUMENTS

| 5,813,675 | A | 9/1998 | Otto |
| 2007/0076994 | A1 | 4/2007 | Norimatsu et al. |

FOREIGN PATENT DOCUMENTS

| CN | 1 985 114 | 6/2007 |
| DE | 10 2006 047 014 | 4/2007 |
| EP | 1 783 405 | 5/2007 |
| JP | 2001-510534 | 7/2001 |
| JP | 2003-222145 | 8/2003 |
| JP | 2005-233287 | 9/2005 |
| JP | 2005-291485 | 10/2005 |
| JP | 2005-337423 | 12/2005 |
| JP | 2006-010056 | 1/2006 |
| JP | 2006-038120 | 2/2006 |
| JP | 2007-132454 | 5/2007 |
| JP | 2007-285322 | 11/2007 |
| WO | WO97/16662 | 5/1997 |
| WO | WO2006-008898 | 1/2006 |
| WO | WO2007/122809 | 11/2007 |

*Primary Examiner* — William C Joyce
(74) *Attorney, Agent, or Firm* — Harness, Dickey & Pierce, P.L.C.

(57) ABSTRACT

A vehicle wheel bearing apparatus has an outer member, an inner member, double row rolling elements freely rollably contained between outer and inner raceway surfaces of the outer and inner members, and seals mounted within annular openings formed between the outer and the inner members. A backup seal is arranged radially outward of an outer side seal of the seals. The backup seal has a sealing lip inclined radially outward toward the outer side. The sealing lip slidingly contacts an annular metal member that is pressed from a steel sheet having preservation properties. The annular metal member is bolted on a side face of the wheel mounting flange of the inner side.

17 Claims, 24 Drawing Sheets

[Fig 1]
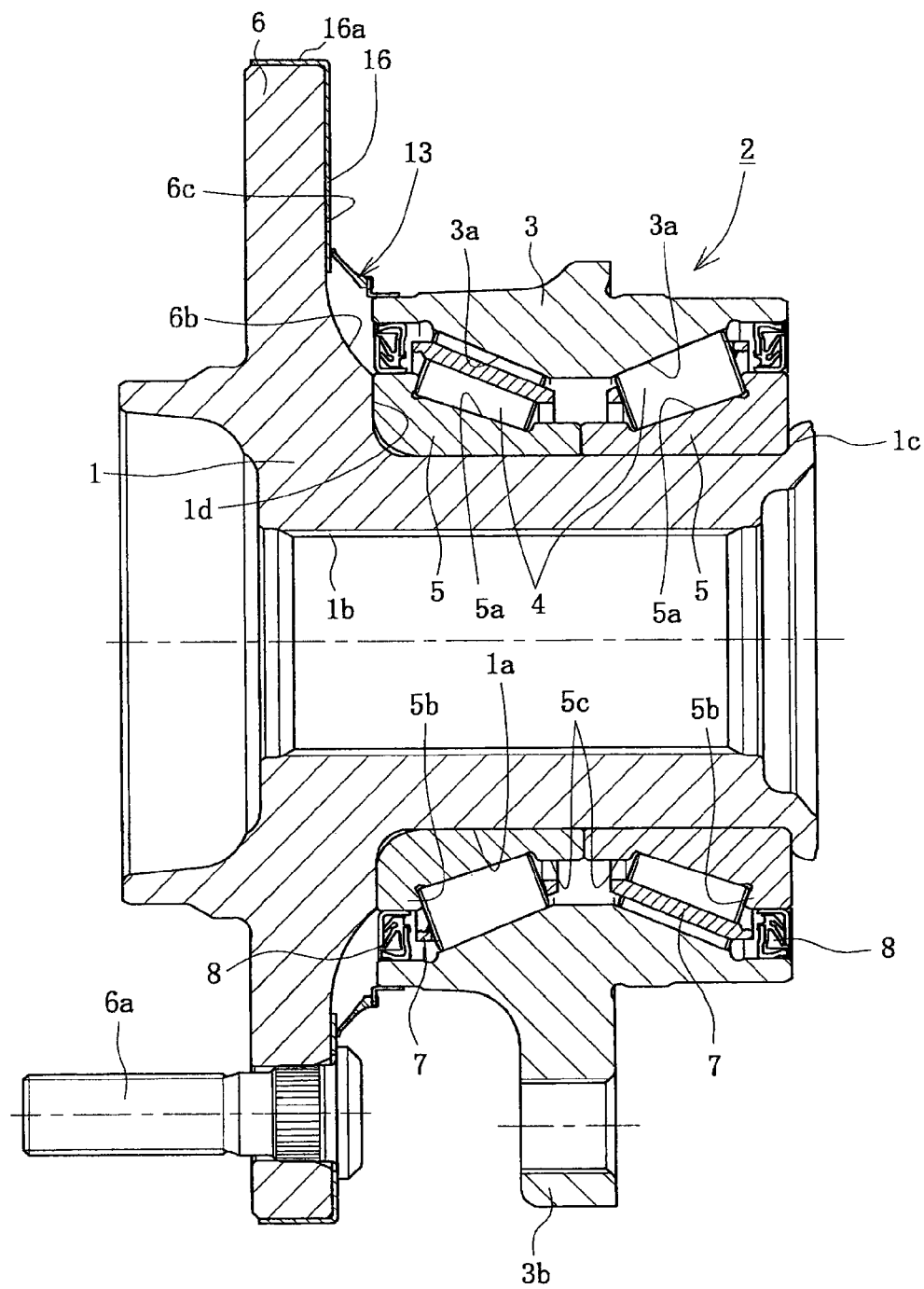

[Fig 2]
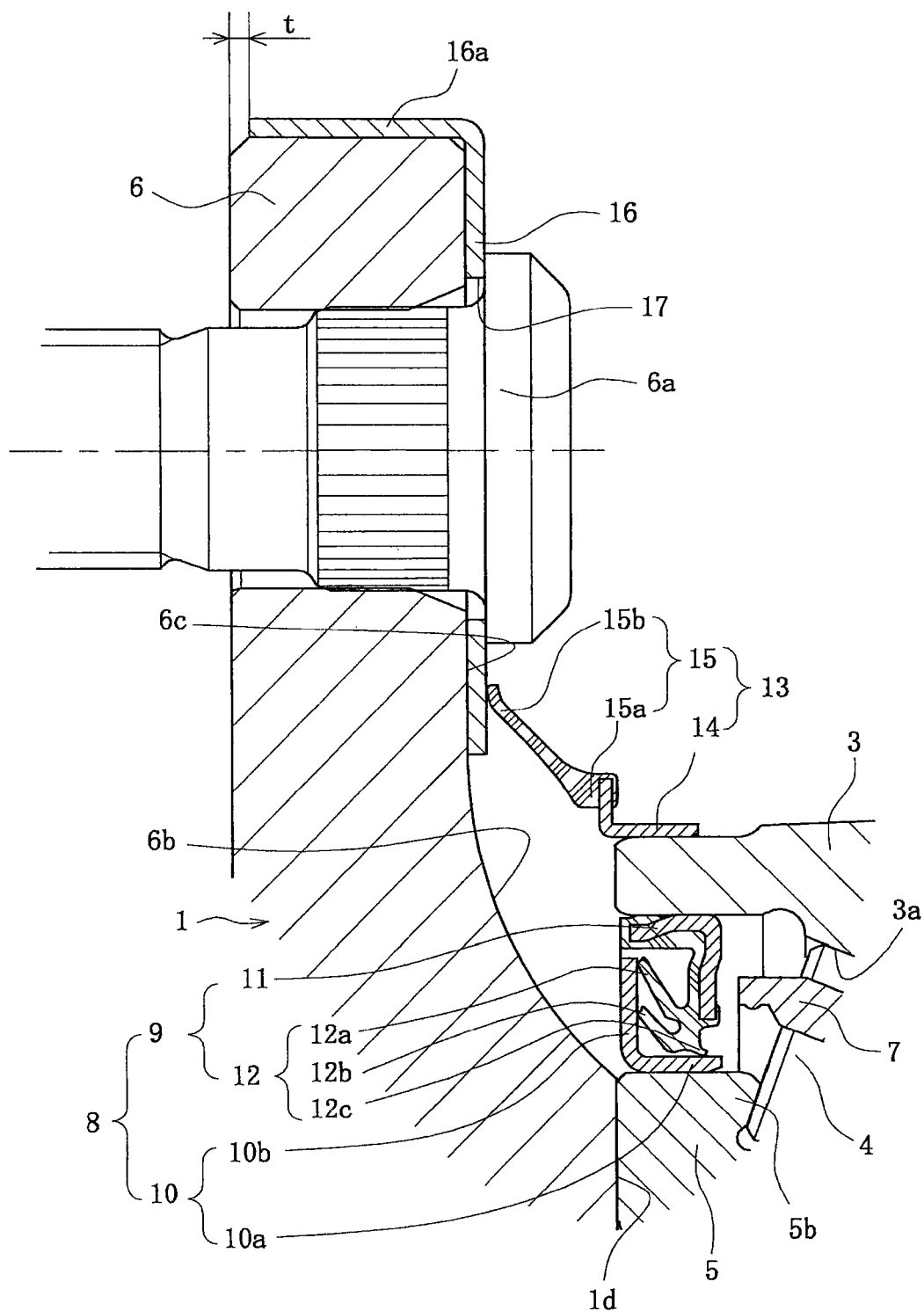

[ Fig 3 ]
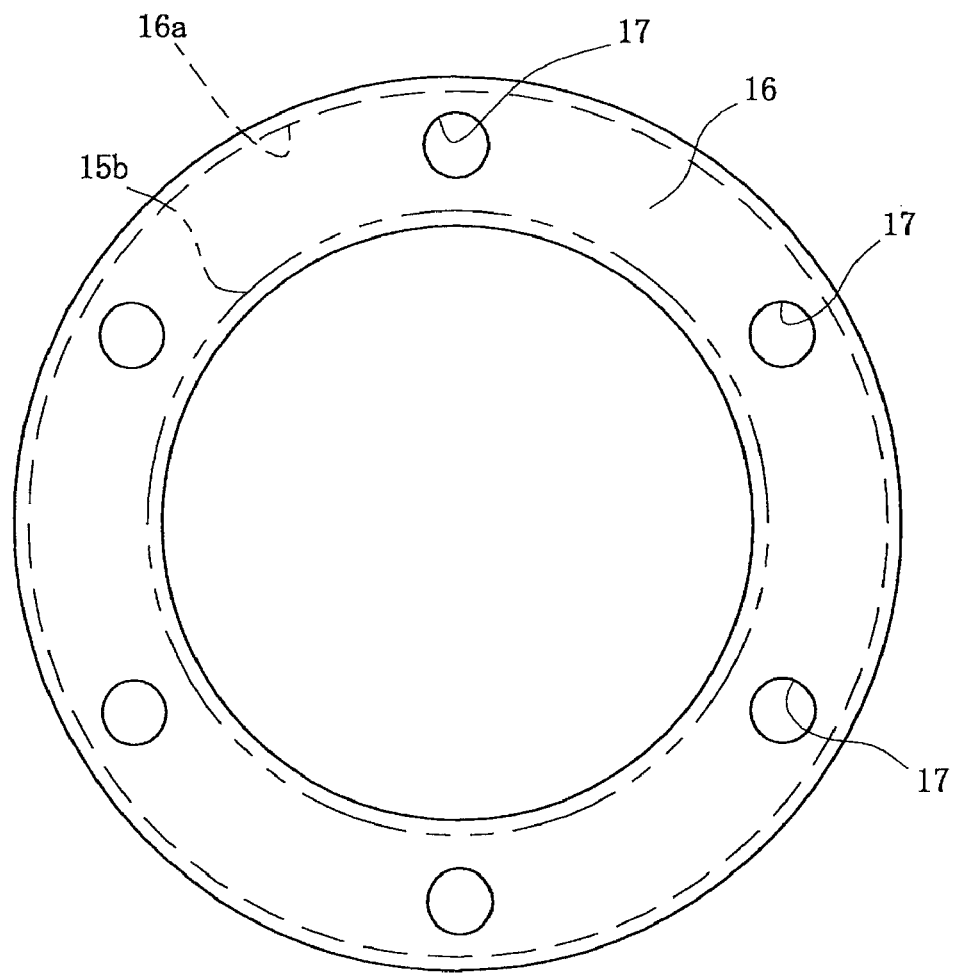

[Fig 4]
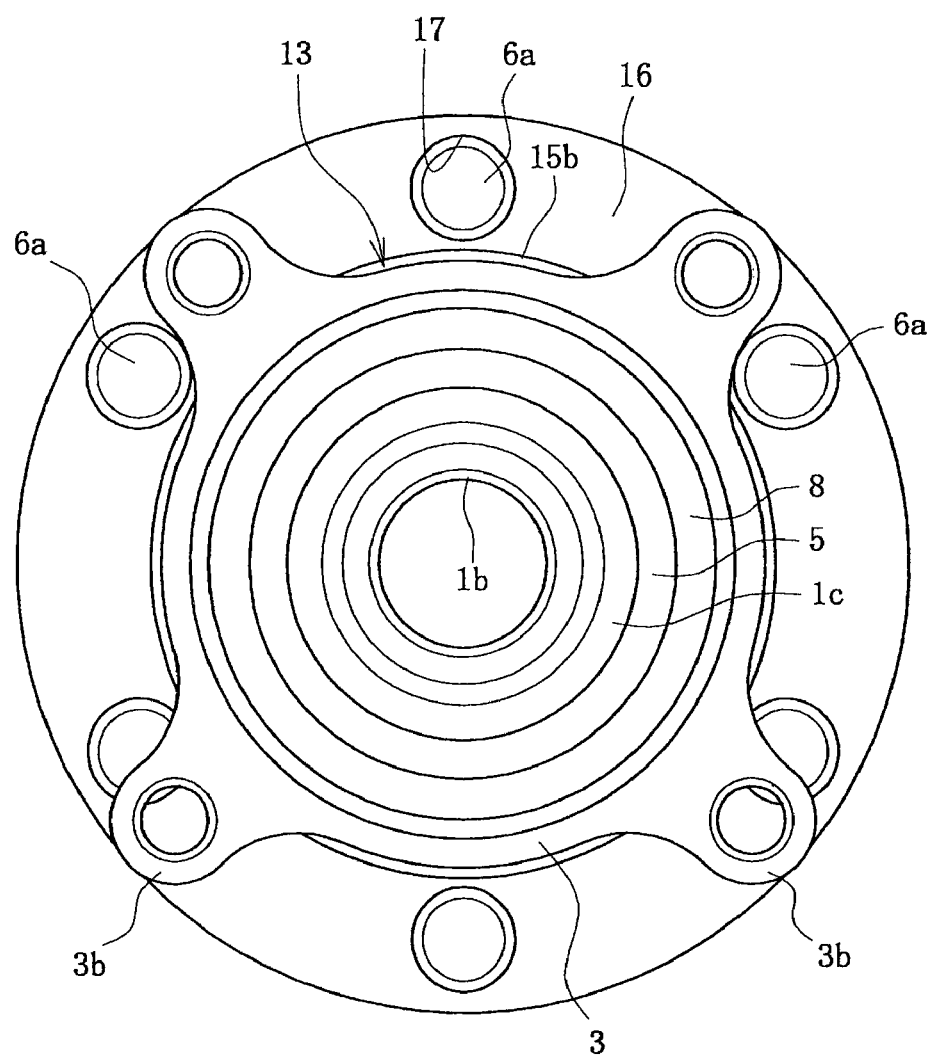

[Fig 5]
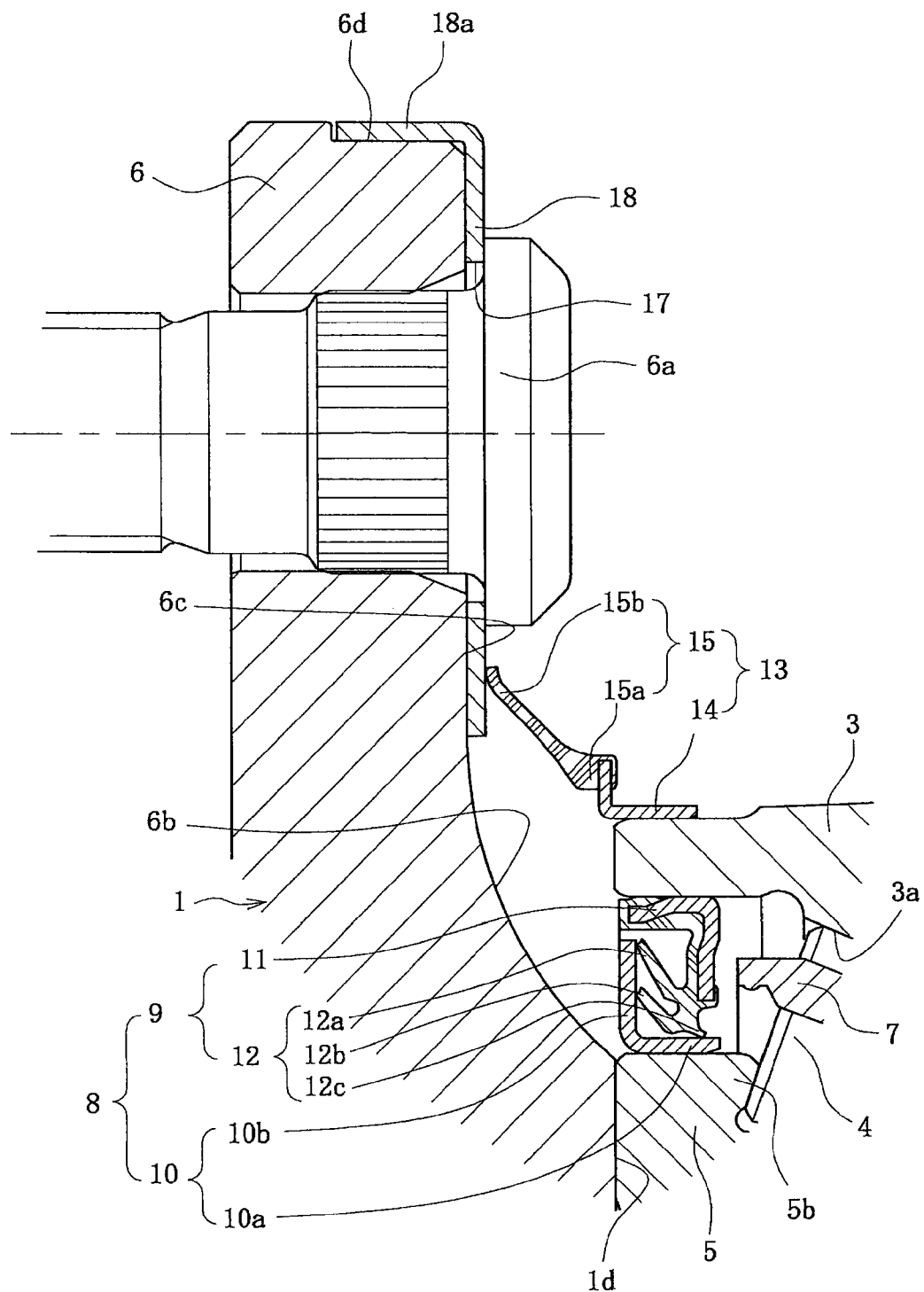

[ Fig 6 ]
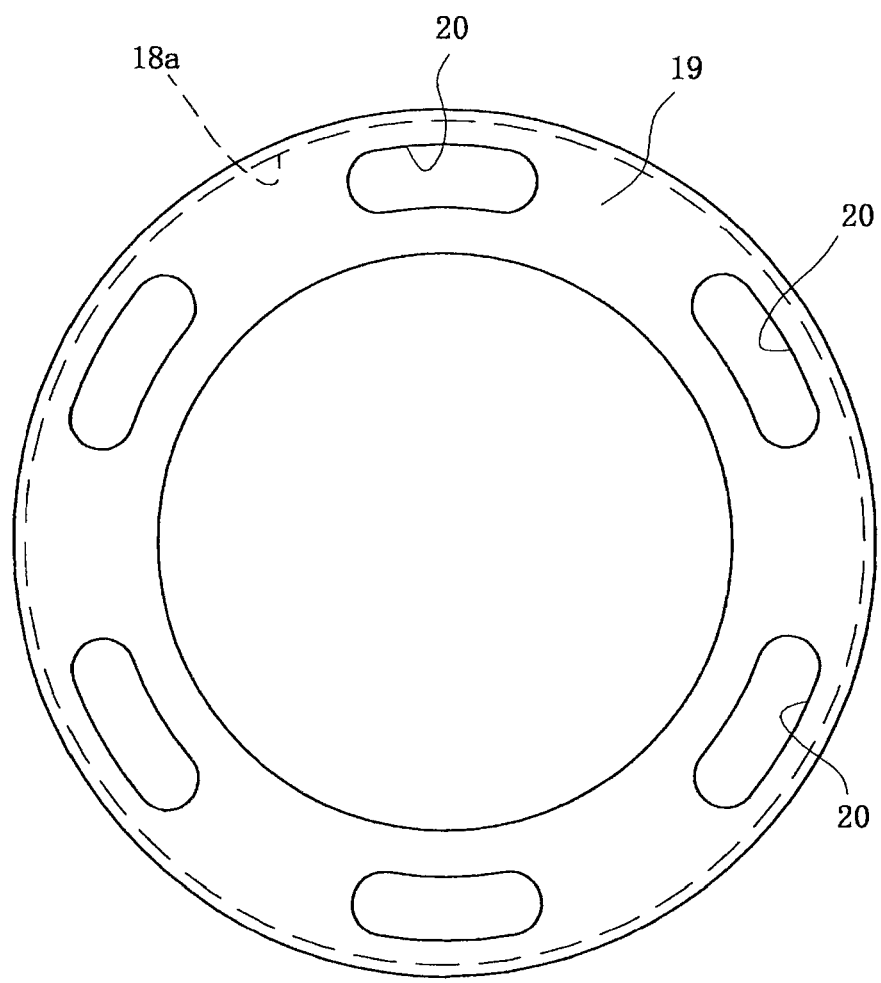

[Fig 7]
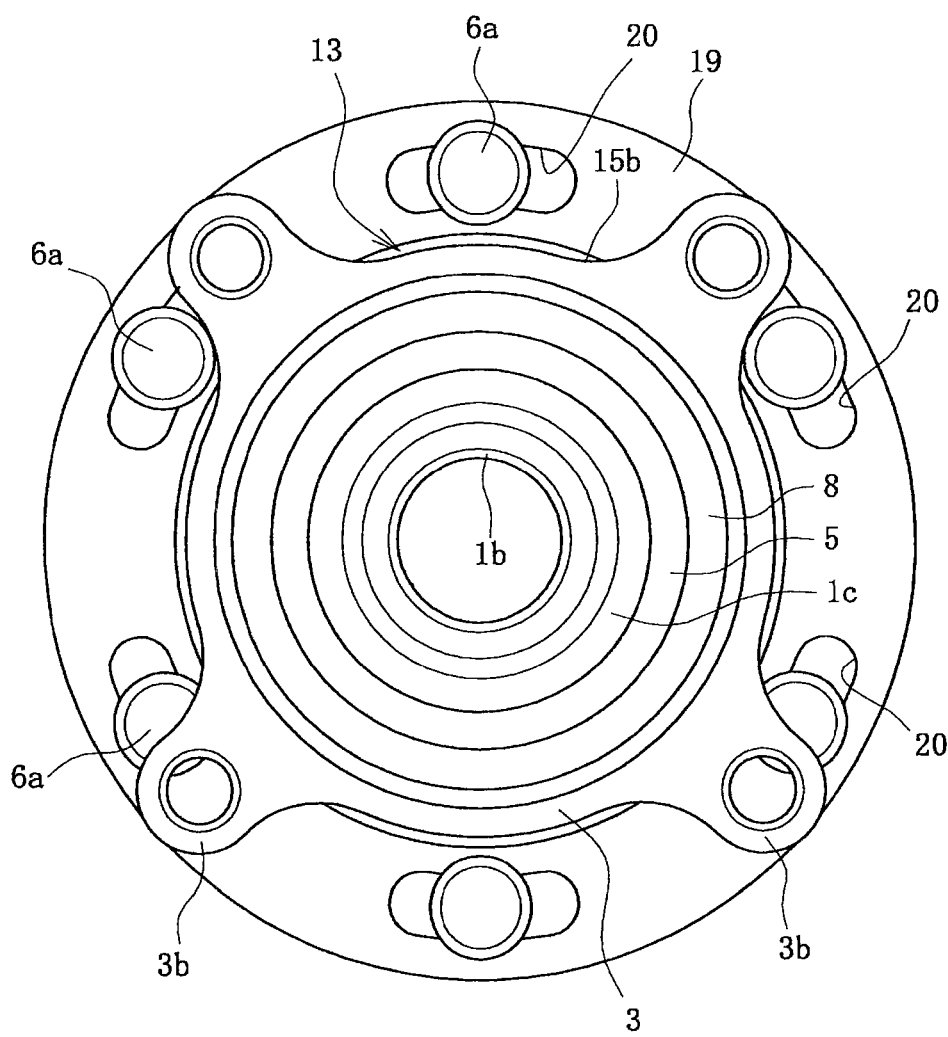

[Fig 8]
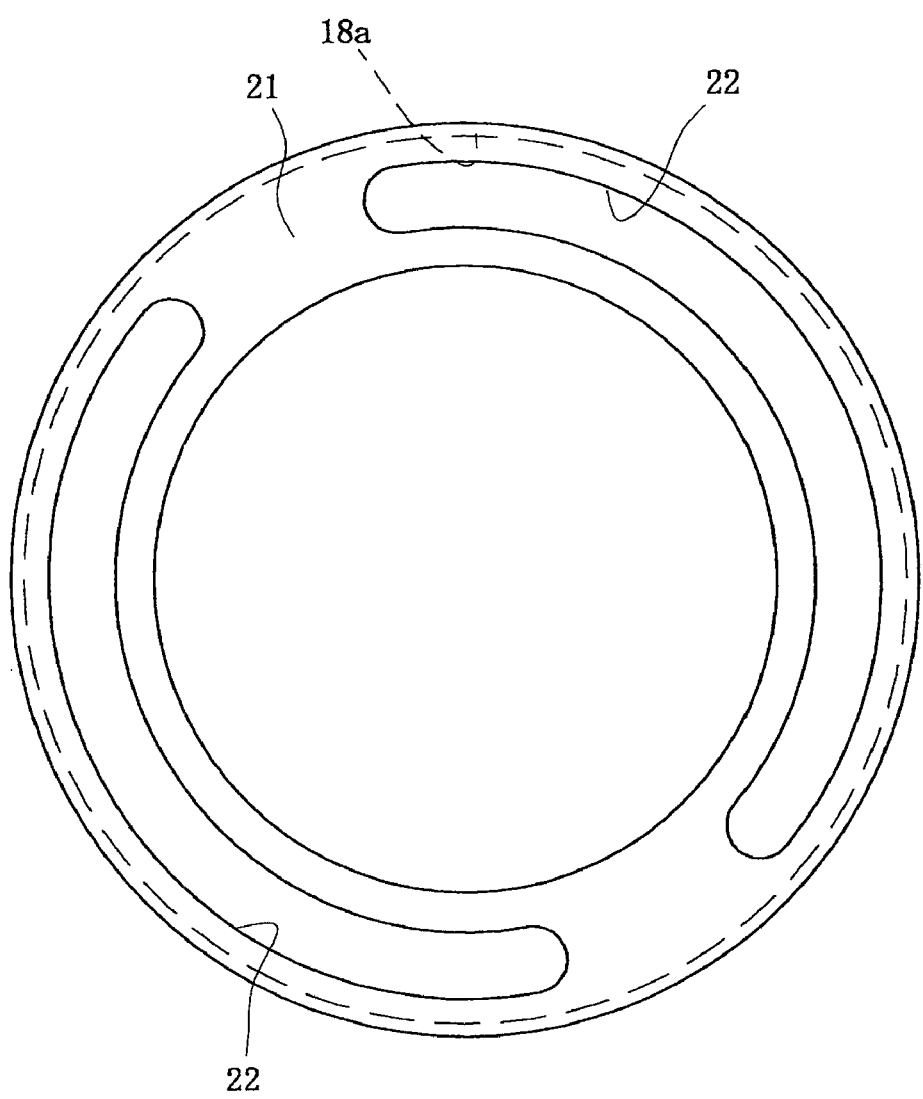

[ Fig 9 ]
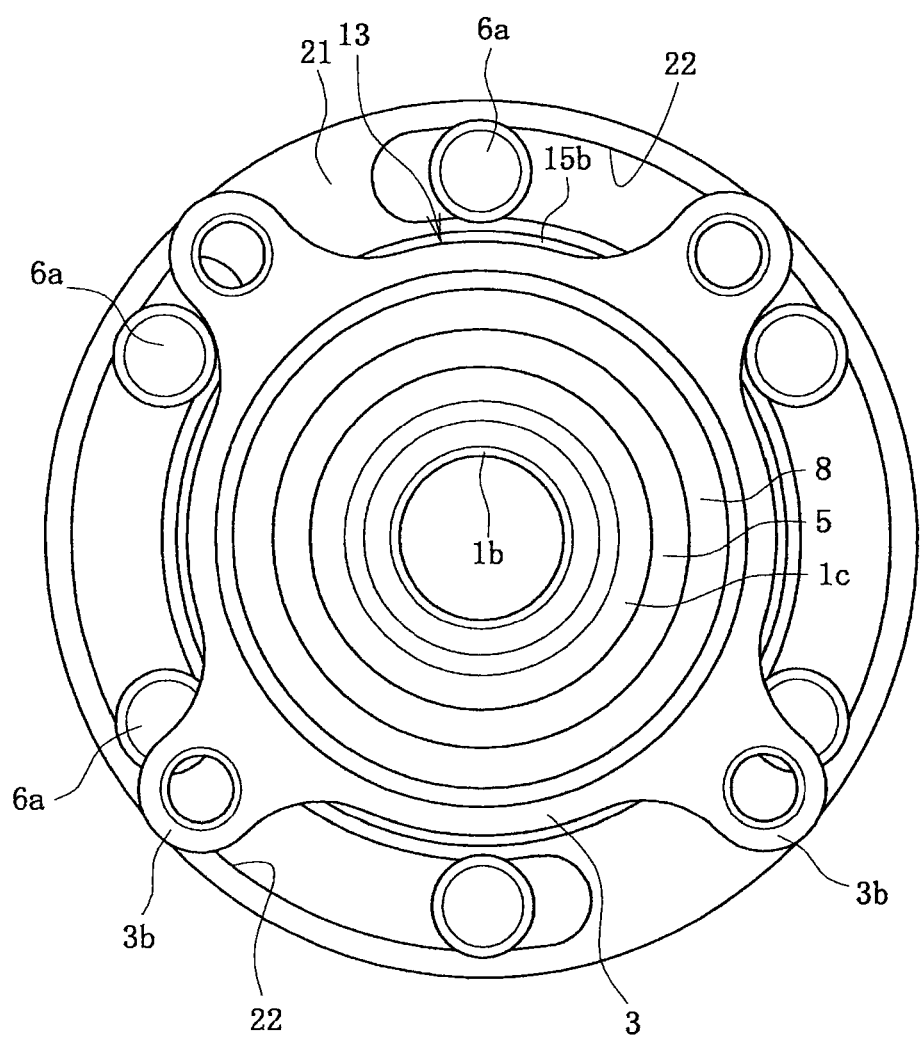

[Fig 10]
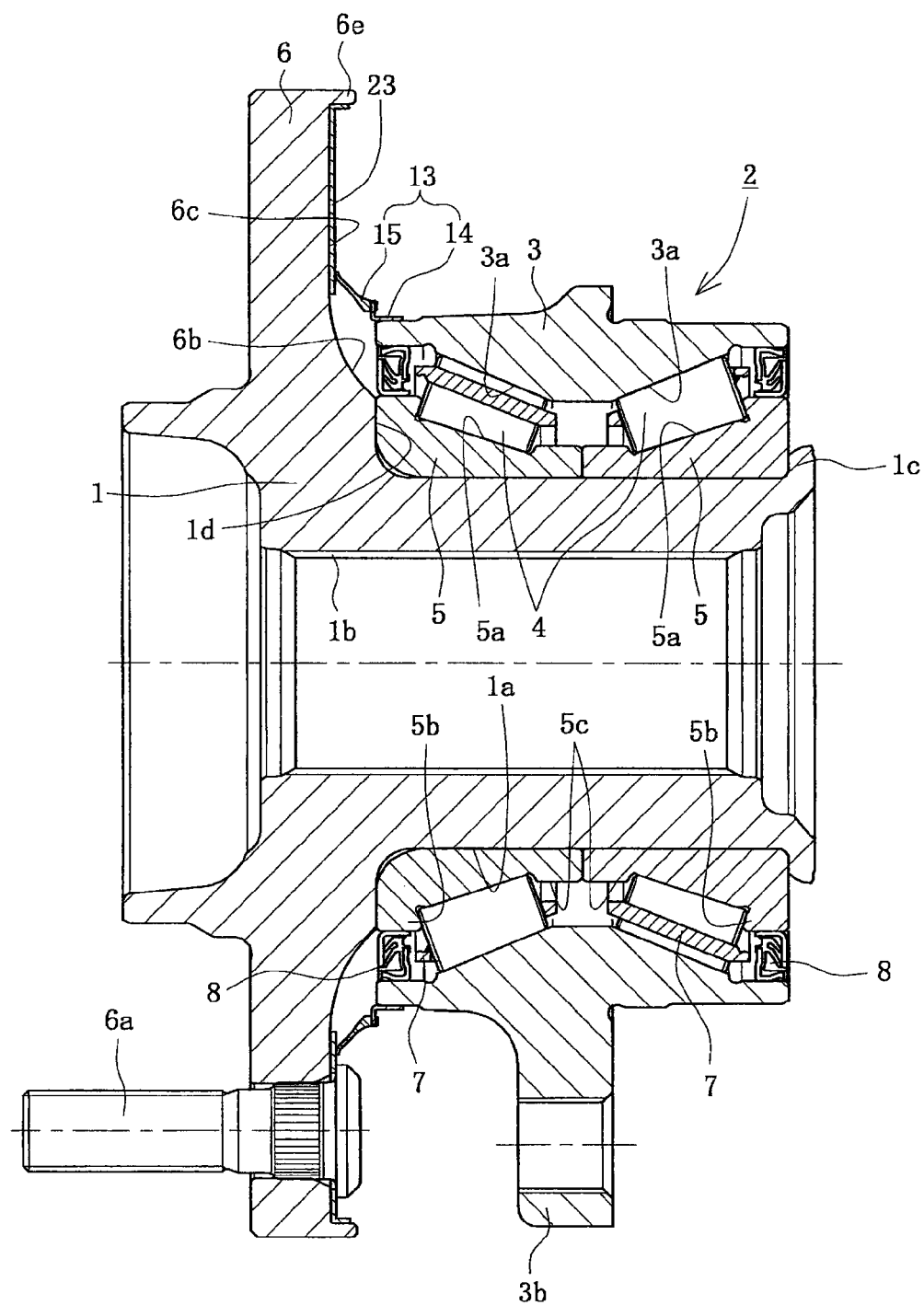

[Fig 11]
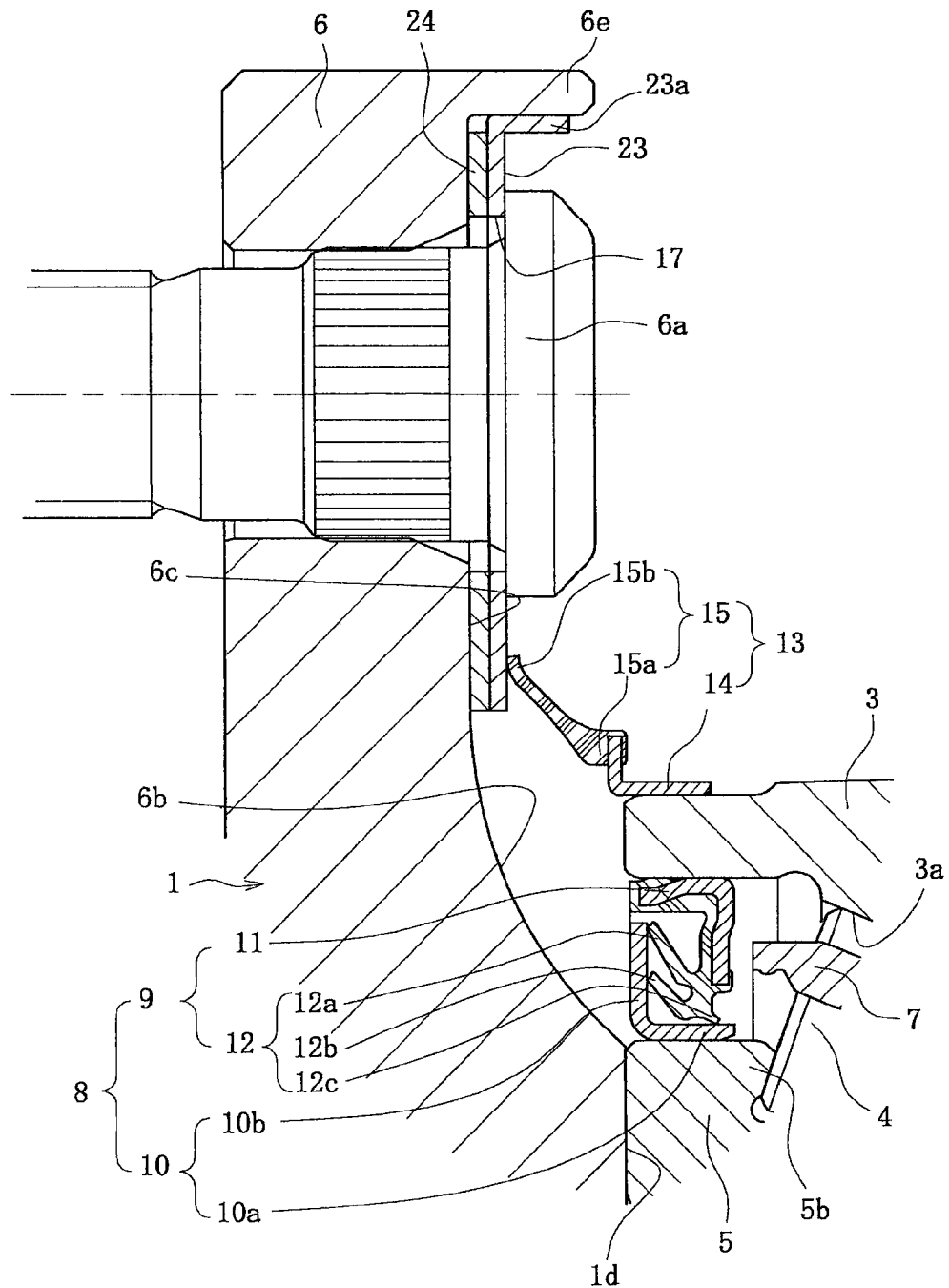

[Fig 12]
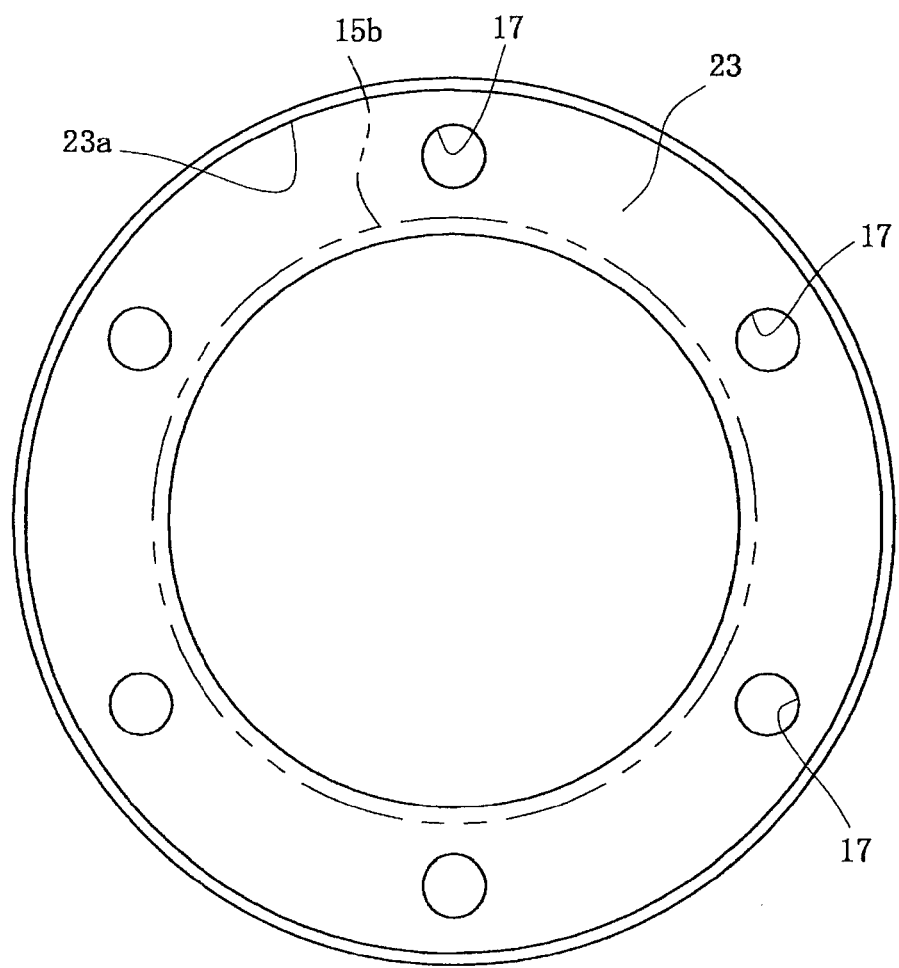

[ Fig 13 ]
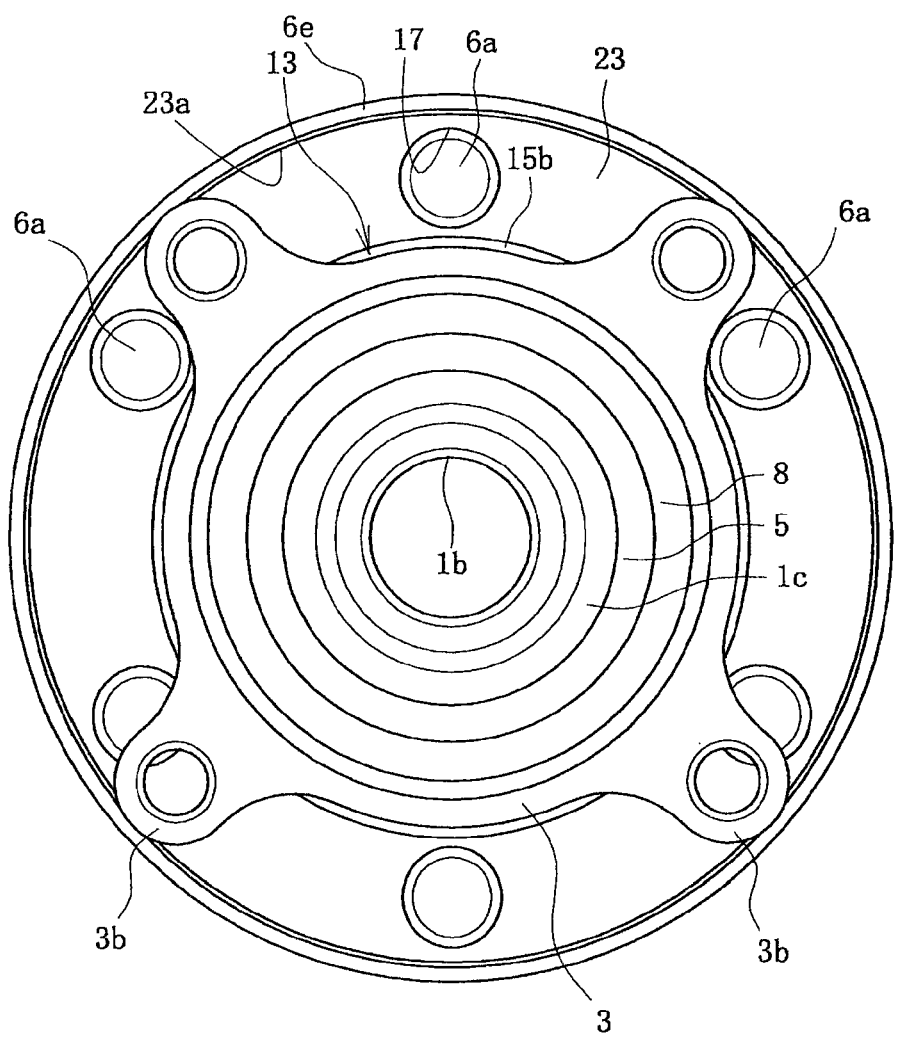

[ Fig 14 ]
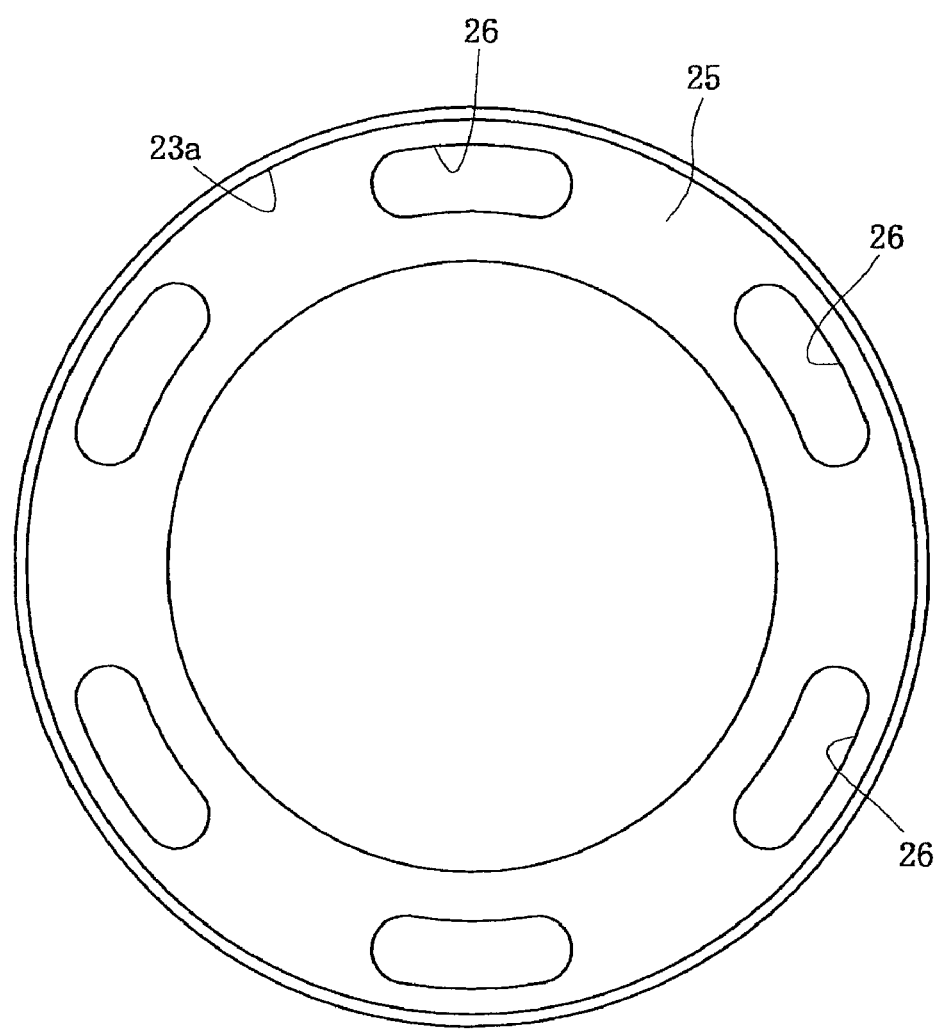

[ Fig 15 ]
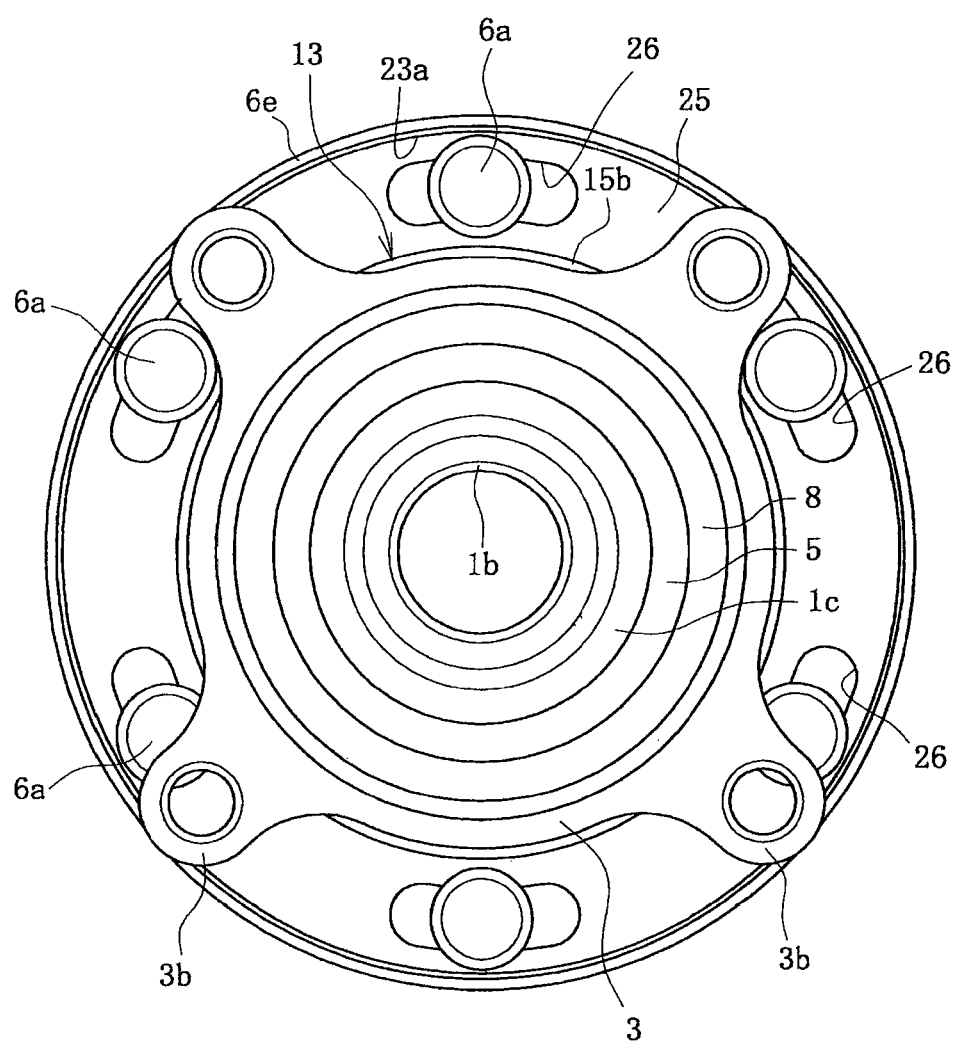

[ Fig 16 ]
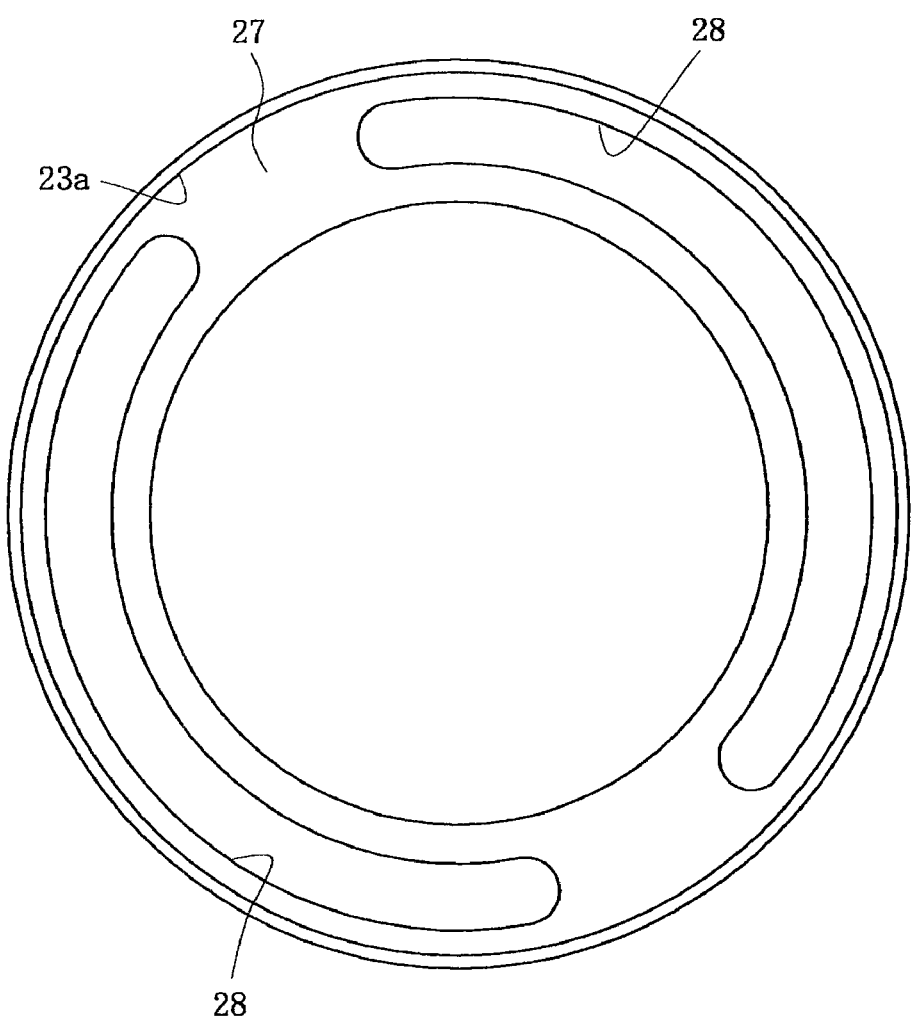

[ Fig 17 ]
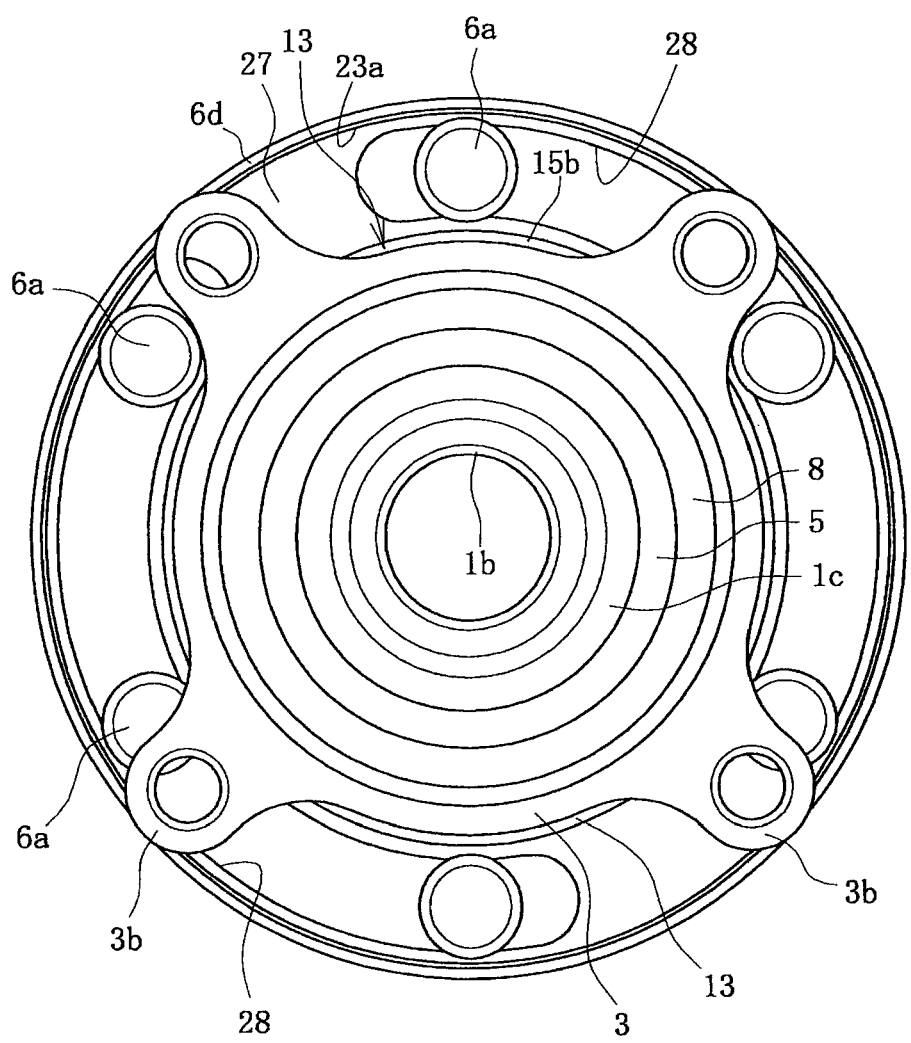

[Fig 18]
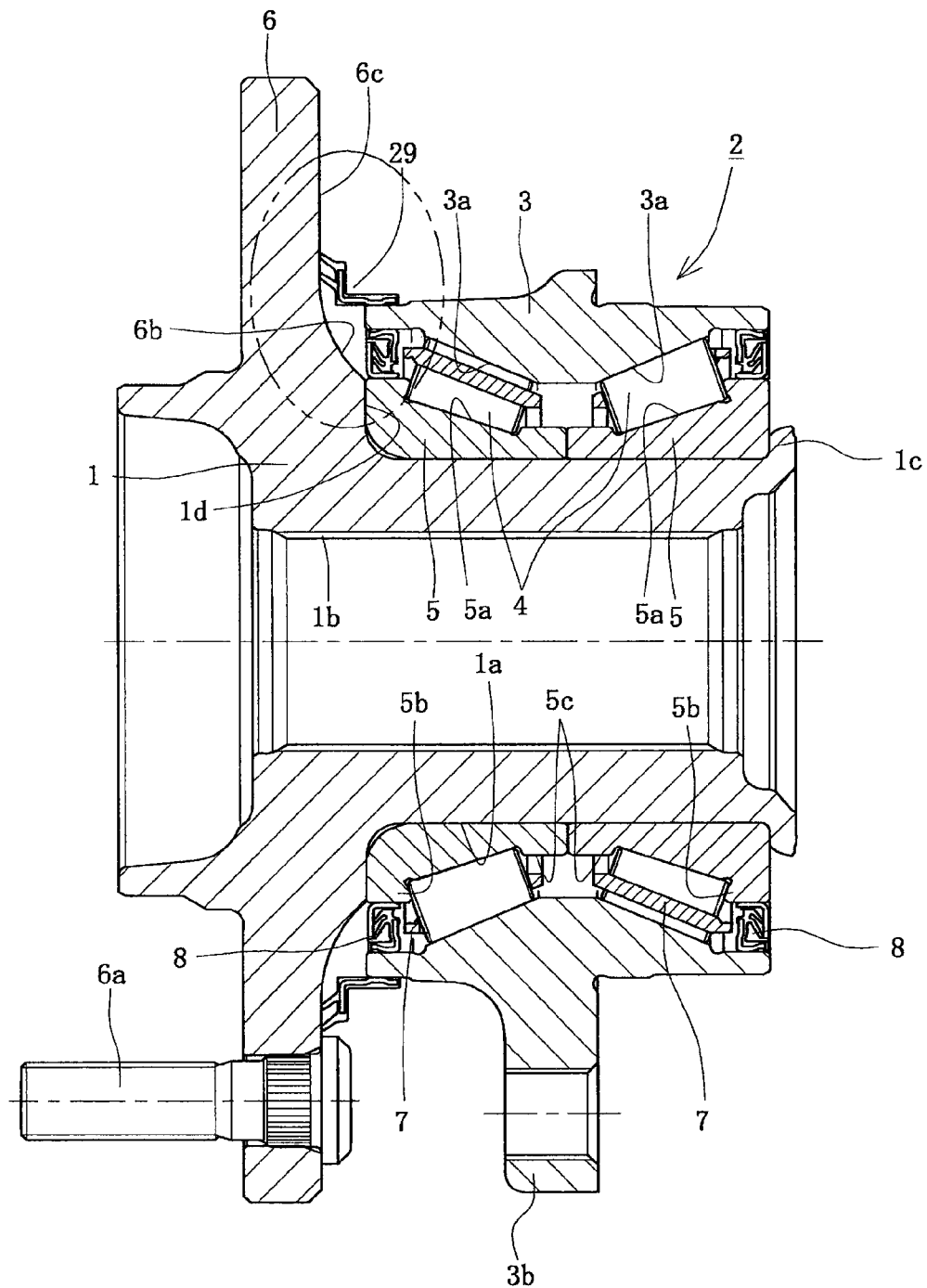

[Fig 19]
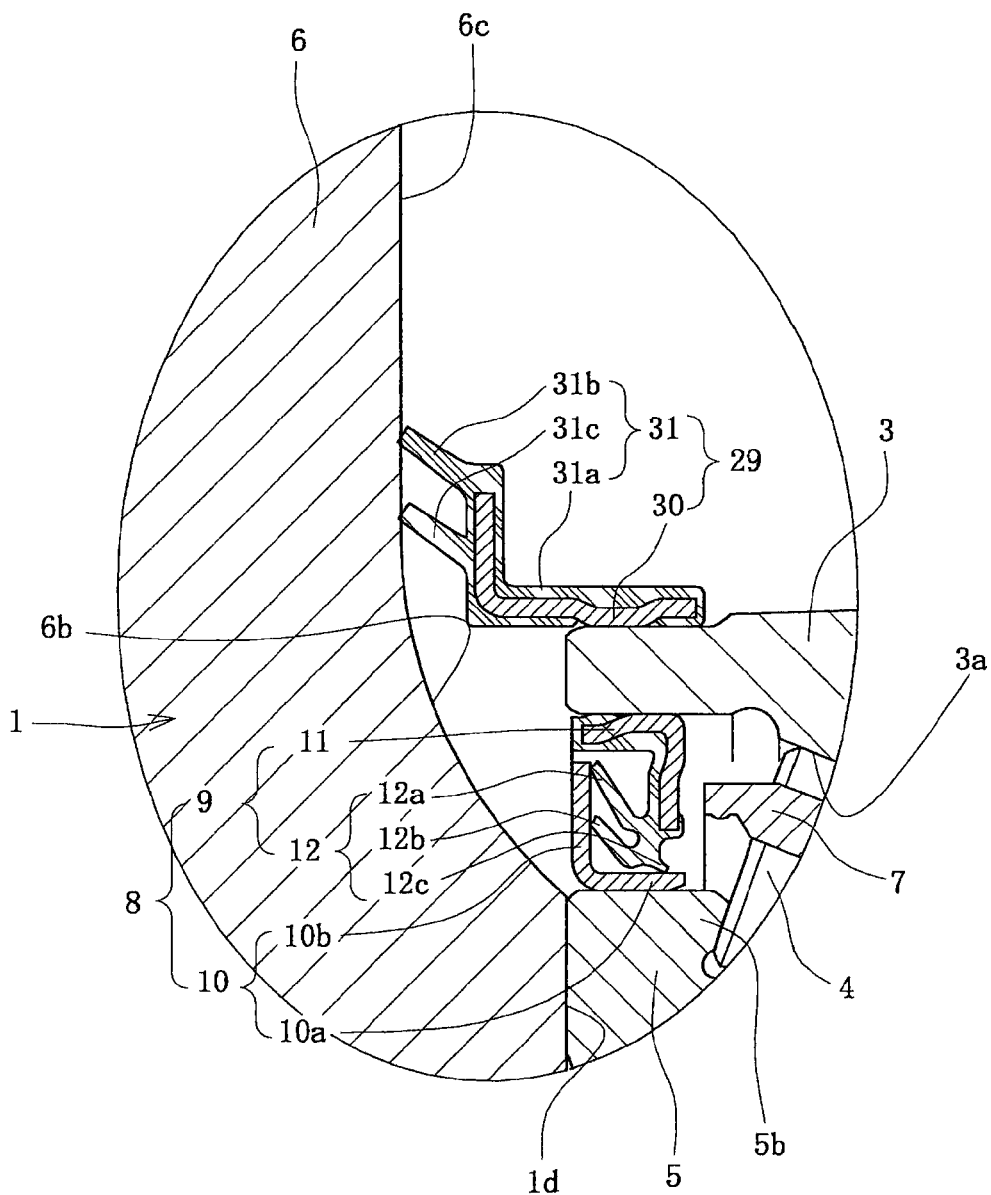

[Fig 20]
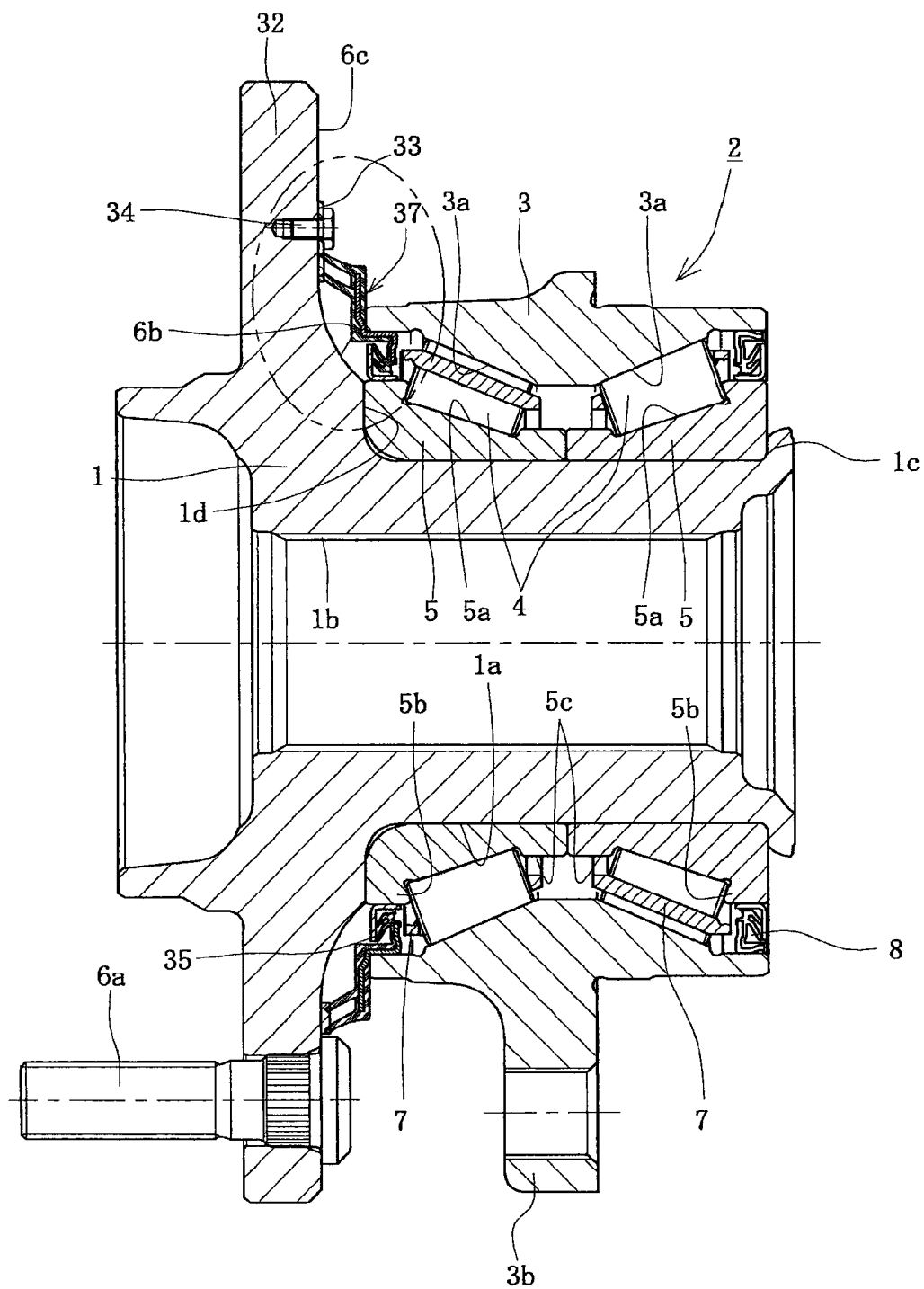

[ Fig 21 ]
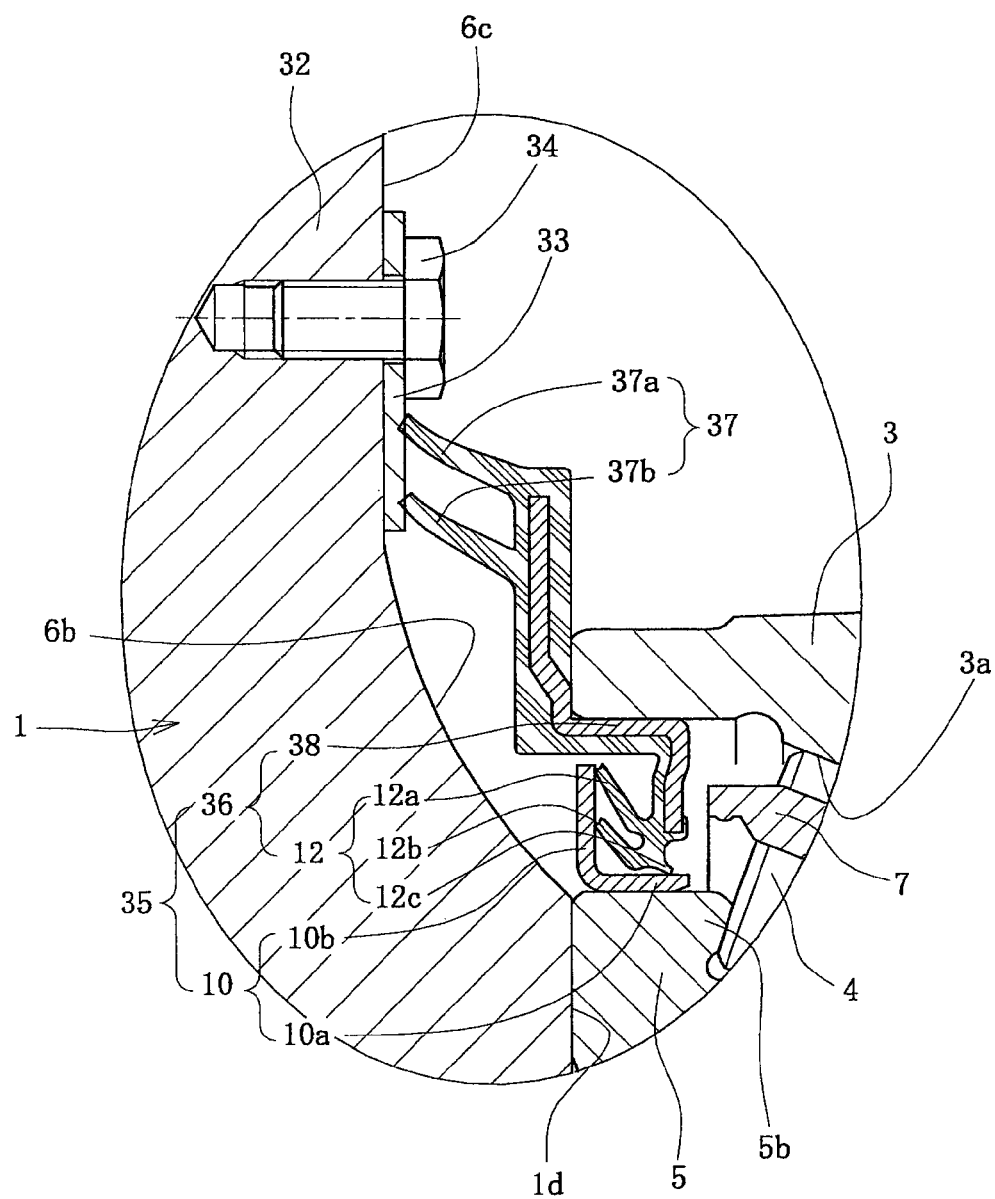

[Fig 22]
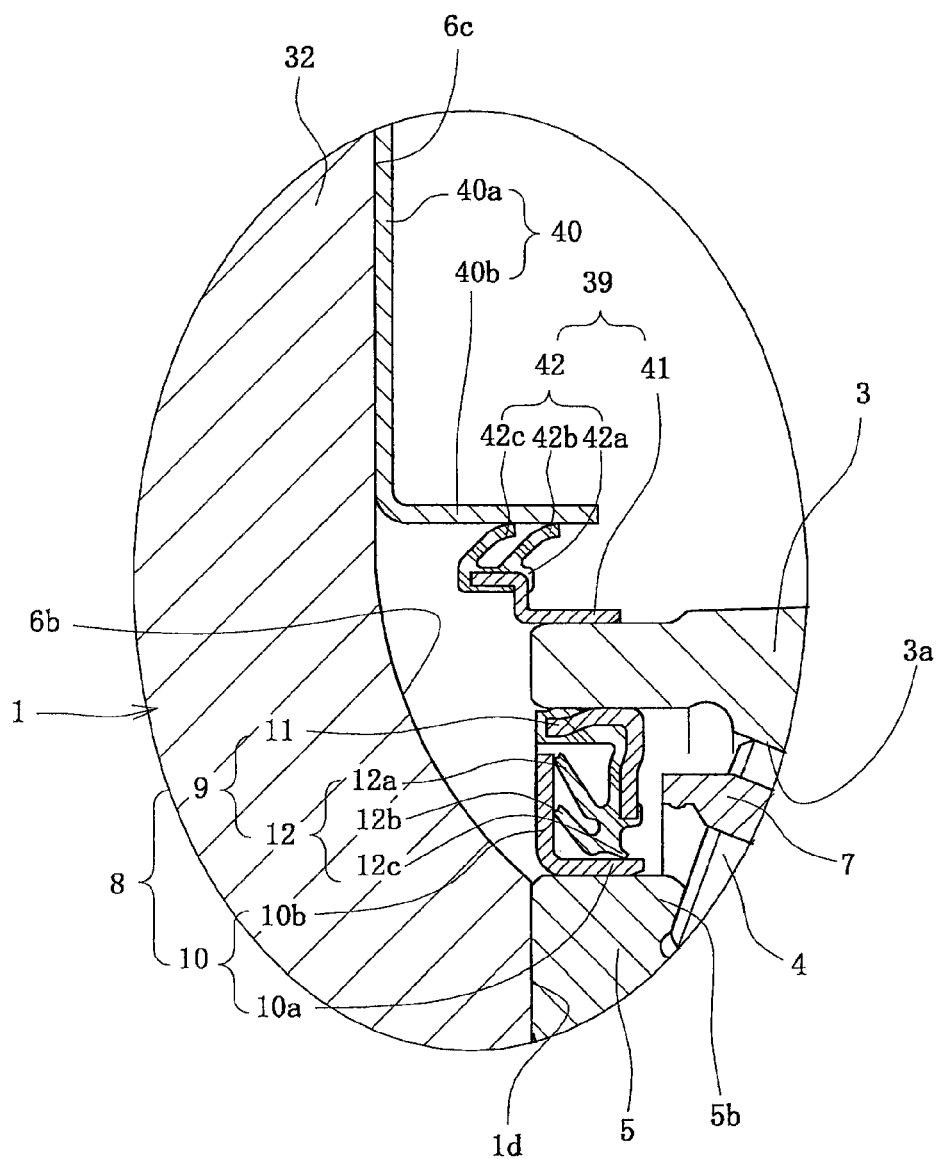

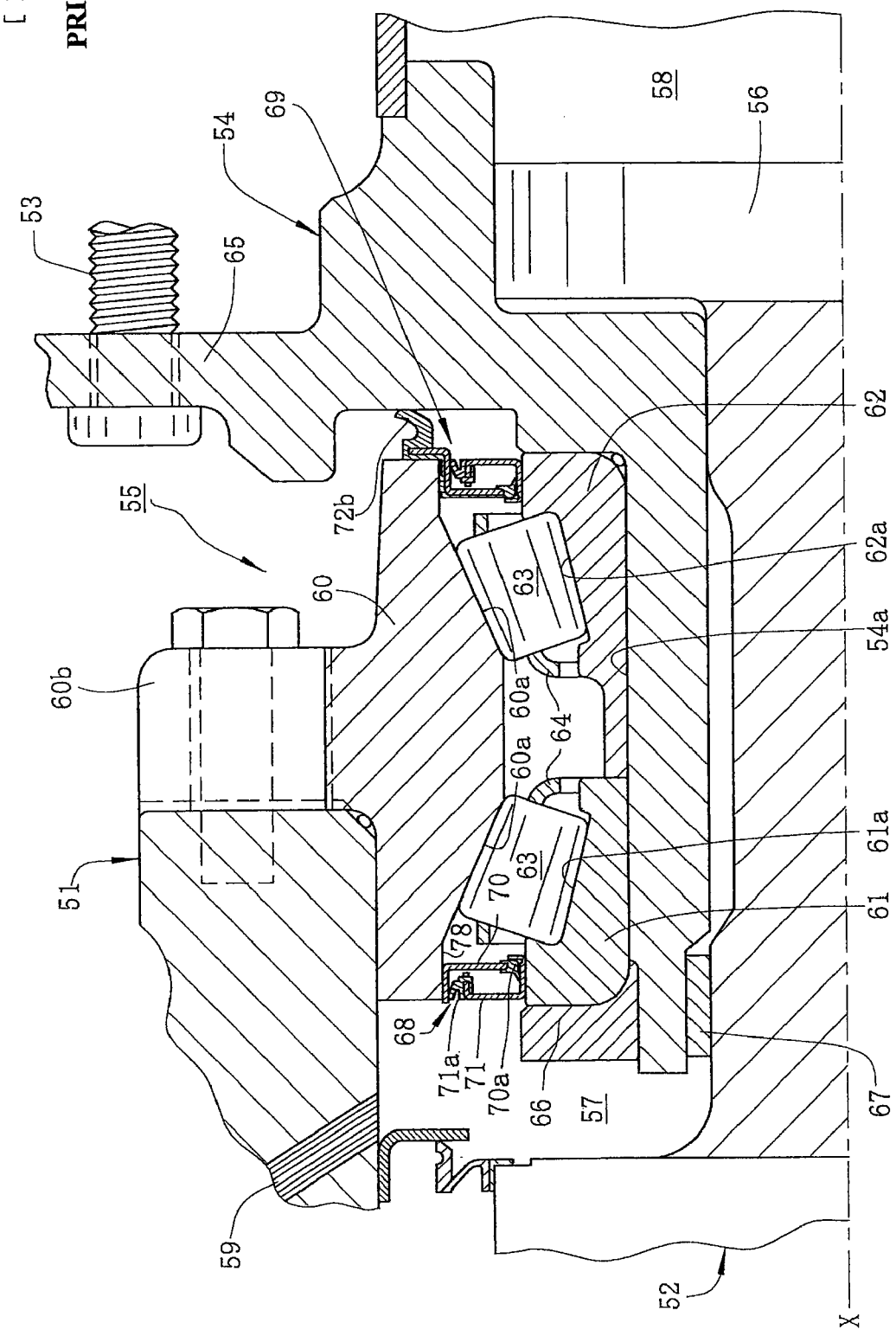
[Fig 23] PRIOR ART

[ Fig 24 ]
PRIOR ART
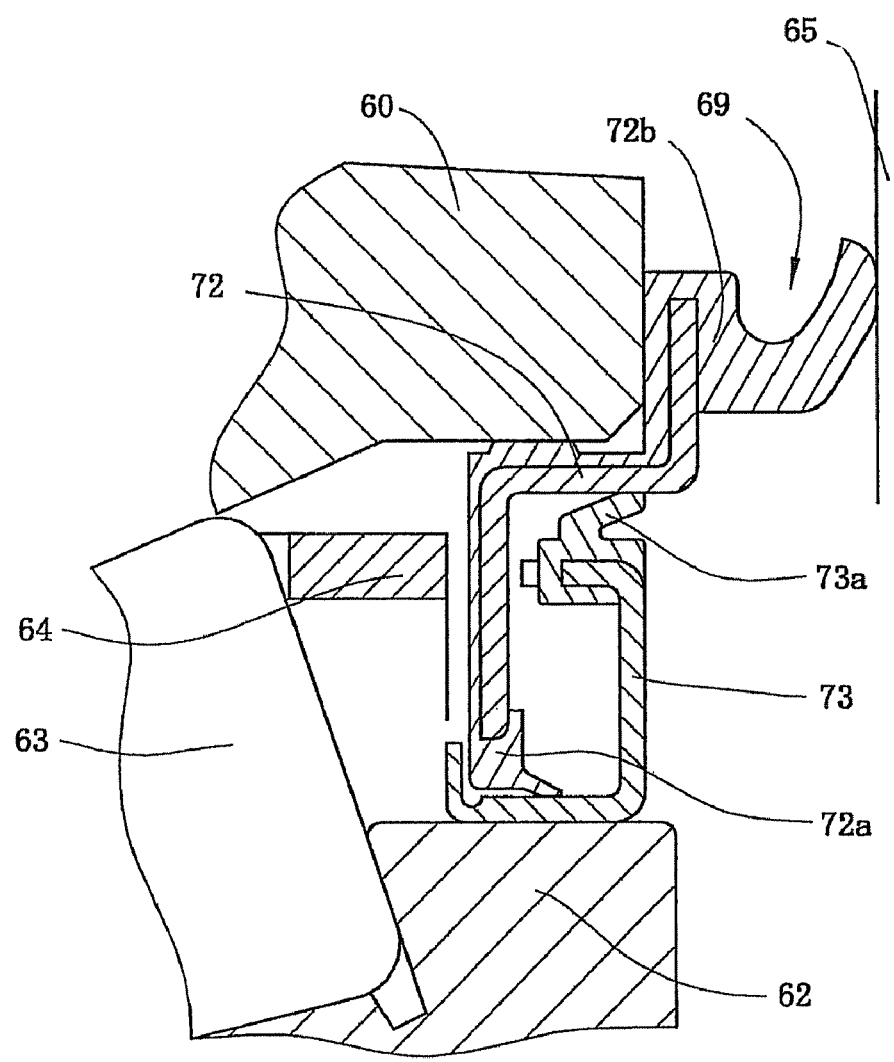

WHEEL BEARING APPARATUS FOR A VEHICLE

CROSS-REFERENCE TO RELATED APPLICATIONS

This application is a continuation of International Application No. PCT/JP2007/001019, filed Sep. 20, 2007, which claims priority to Japanese Application Nos. 2006-274712, filed Oct. 6, 2006; 2006-274713, filed Oct. 6, 2006; and 2006-351741, filed Dec. 27, 2006. The disclosures of the above applications are incorporated herein by reference.

FIELD

The present disclosure relates to a wheel bearing apparatus that freely rotationally supports a wheel of a vehicle, such as an automobile and, more particularly, to a wheel bearing apparatus with improved sealability.

BACKGROUND

The wheel bearing apparatus for supporting a vehicle wheel that freely rotatably supports a wheel hub for mounting a wheel, via a rolling bearing, is used for driving wheels and driven wheels. For structural reasons, the inner ring rotation type is used for driving wheels and both the inner ring rotation type and the outer ring rotation type are used for driven wheels. In such a wheel bearing apparatus, a double row angular contact ball bearing is widely used. The double row angular contact bearing has several merits, such as a desirable bearing rigidity, a high durability against misalignment, and a small rotational torque resistance contributing to improved fuel consumption. On the other hand a double row angular contact tapered roller bearing is used for heavy weight vehicles such as off-road cars and trucks, etc.

These types of wheel bearing apparatus are arranged at places liable to be splashed by muddy water. Thus, they are provided with a sealing apparatus to seal spaces between outer and inner members. In general, a sealing member with sealing lips, of the sealing apparatus, is mounted on the outer member to form a secured member. The sealing lips are adapted to be in sliding contact with an outer circumferential surface of the inner member. Several mechanisms to improve sealability have been used, especially in vehicles used in severe circumstances such as off-road cars and trucks, etc.

One example of such wheel bearing apparatus is shown in FIG. 23. The wheel bearing apparatus includes a knuckle 51 secured on a chassis. An axle 52 extends through the knuckle 51. A wheel hub 54 is mounted on the axle 52. A wheel (not shown) is fastened via bolts 53 to the wheel hub 54. A wheel bearing 55 rotationally supports the wheel hub 54 and the axle 52. A clutch 56, controlled by pneumatic pressure, engages and disengages the axle 52 and the wheel hub 54.

An annular chamber (vacuum chamber) 57 is formed between the knuckle 51 and the axle 52 and communicates with the clutch 56 arranged within a sealed chamber 58, of the outer side (right-hand side in FIG. 23). A negative pressure acts on the clutch 56 and the clutch 56 acts to engage the axle 52 and the wheel hub 54 when the pressure within the annular chamber 57 is lower than atmospheric pressure. The clutch 56 acts to disengage them when the annular chamber 57 is at atmospheric pressure. The annular chamber 57 communicates with a vacuum pump (not shown) via a vacuum passage 59 that obliquely extends through the knuckle 51.

The wheel bearing 55 is a double row tapered roller bearing with an outer member 60 formed on its outer circumference with a body mounting flange 60b that is mounted on the knuckle 51. Its inner circumference has double row tapered outer raceway surfaces 60a, 60a. Inner rings 61, 62 are formed on their outer circumference, with tapered inner raceway surfaces 61a, 62a that oppose the double row outer raceway surfaces 60a, 60a, respectively. Double row tapered rollers 63, 63 are contained between the outer and inner raceway surfaces 60a, 60a: 61a, 62a. Cages 64, 64 freely rollably hold the double row tapered rollers 63, 63.

The wheel hub 54 has a wheel mounting flange 65 integrally formed at one end. A cylindrical portion 54a axially extends from the wheel mounting flange 65. The wheel bearing 55 is press fit onto the cylindrical portion 54a of the wheel hub 54. It is axially immovably secured by a securing nut 66. A sliding bearing 67 is arranged between the axle 52 and the wheel hub 54 to allow a relative rotation between the two.

Seals 68, 69 are arranged at both ends of the wheel bearing 55. They seal openings of the annular spaces formed between the outer member 60 and the inner rings 61, 62. Also, the seals isolate the annular chamber 57 from the surrounding circumstances. The seal 68 includes an outer case 70 press fit into the outer member 60 and an inner case 71 press fit onto the inner rings 61. Sealing lips 70a, 71a are integrally bonded to an inner circumference of the outer case 70 and an outer circumference of the inner case 71 so that they slidingly contact the case 71 and the outer case 70, respectively. These sealing lips 70a, 71a can be deflected by a pressure difference between the inside of the wheel bearing 55 and the annular chamber 57. This discharges air within the inside of the wheel bearing 55 to the annular chamber 57. Accordingly, the pressure of the inside of the wheel bearing 55 becomes the same pressure as that in the annular chamber 57 when the annular chamber 57 is evacuated.

The seal 69 includes an outer case 72 press fit into the outer member 60. An inner case 73 is press fit onto the inner ring 62, as shown in FIG. 24. A sealing lip 72a slidingly contacts the inner case 73. A side lip 72b slidingly contacts a side face of the wheel mounting flange 65. Both are integrally bonded to both ends of the outer case 72. In addition, a sealing lip 73a is integrally bonded to an outer circumferential edge of the inner case 73. This seal 69 functions to apply a pressure difference so that the inside of the wheel bearing 55 can be held at a predetermined reduced pressure. This prevents rain water or dusts from entering into the inside of the wheel bearing. Japanese Laid-open Patent Application No. 2001/510534

In the prior wheel bearing apparatus, it is possible to have excellent sealing properties since a side lip 72b is provided in sliding contact with the side face of the wheel mounting flange 65. In addition, sealing lips 72a, 73a are in sliding contact with the inner and outer cases 72, 73, respectively. However, since it is configured so that the side lip 72b is in direct sliding contact with the side face of the wheel mounting flange 65, the side face of the wheel mounting flange 65, with which the side lip 72b contacts, should be finished to have a predetermined surface roughness. This increases the machining steps and thus the manufacturing cost. Furthermore, corrosion would be easily generated on the surface of the wheel hub 54 made of carbon steel. Accordingly, it is difficult to keep a stable seal for a long term in the structure where the side lip 72b directly contacts the side face of the wheel mounting flange 65. The side lip 72b is prematurely deteriorated by the corroded side surface of the wheel mounting flange 65.

SUMMARY

Thus, it is an object of the present disclosure to provide a vehicle wheel bearing apparatus that can improve sealing properties and keep a good bearing performance for a long term.

To achieve the object, a vehicle wheel bearing apparatus is provided with an outer member formed, on its outer circumference, with a body mounting flange to be mounted on a suspension of a vehicle. Its inner circumference includes double row outer raceway surfaces. An inner member includes a wheel hub formed with a wheel mounting flange on one of its ends. Its outer circumference includes a cylindrical portion. An inner ring or an outer joint member of a constant velocity universal joint is press-fit onto the wheel hub. Its outer circumference is formed with inner raceway surfaces that are arranged opposite to the double row outer raceway surfaces. Double row rolling elements are freely rollably held by cages between the outer and inner raceway surfaces of the outer and inner members. Seals are mounted within annular openings formed between the outer and the inner members. A backup seal is arranged radially outward of an outer side seal of the seals. The backup seal includes a sealing lip inclined radially outward toward the outer side. The sealing lip is in sliding contact with an annular metal member that is pressed from a steel sheet. The metal member has preservation properties and is bolted on a side face of the inner side of the wheel mounting flange.

The wheel bearing of the present disclosure applies to second through fourth generation types. It includes a wheel hub on its one end integrally formed with a wheel mounting flange, outer member, inner member, double row rolling elements rollably contained between the outer and inner members, and seals mounted in the annular openings formed by the outer and inner openings. A backup seal is arranged radially outward of an outer side seal of the seals. The backup seal includes a sealing lip inclined radially outward toward the outer side. The sealing lip is in sliding contact with an annular metal member that is pressed from a steel sheet. The metal member has preservation properties and is bolted on a side face of the wheel mounting flange of the inner side. The vehicle wheel bearing apparatus can eliminate the need to finish the side face of the inner side of the wheel mounting flange, the side lip sliding contacts, to a predetermined surface roughness. This improves the sealability while keeping an excellent sealing contact surface. Thus, this keeps a good bearing performance for a long term.

The annular metal member is formed on its outer circumference with an axially extending cylindrical portion to be fit onto the outer circumference of the wheel mounting flange. This enables an increase in the sealability between the annular metal member and the side face of the inner side of the wheel mounting flange.

A clearance is provided between the end of the cylindrical portion of the annular metal member and a side face of the outer side of the wheel mounting flange. This eliminates interference between the annular metal member and a vehicle wheel.

The outer circumference of the wheel mounting flange is formed with a circumferential stepped recess into which the cylindrical portion of the annular metal member is fit. This avoids interference between the annular metal member and parts of the brake, etc.

The cylindrical portion of the annular metal member is mounted on the outer circumference, via an interference fit. This enables easy mounting of the annular metal member on the wheel mounting flange during assembly of the wheel bearing apparatus.

The outer circumference of the wheel mounting flange is formed with a cylindrical portion that axially extends toward the inner side into which the cylindrical portion of the annular metal member is fit. This makes it possible to prevent the entry of rain water or dusts into the inside of the annular metal member and thus keeps good sealability for a long term.

The cylindrical portion of the annular metal member is interference fit onto the cylindrical portion of the wheel mounting flange. This holds the annular metal member on the wheel mounting flange although it is not sandwiched by the hub bolts on the side face of the inner side of the mounting flange. Thus, this improves the workability of mounting of the hub bolts during assembly and service.

The annular metal member is finished so that it has a predetermined surface hardness and surface roughness. This makes it possible to have a good seal sliding contact surface by simply mounting the annular metal member on the wheel mounting flange. This suppresses wear of the sealing lip (or lips) and the annular metal member and thus keeps a good seal for a long term.

An elastic member is interposed between the annular metal member and the wheel mounting flange. This improves the bonding strength between the annular metal member and the wheel mounting flange.

The backup seal includes a plurality of sealing lips integrally formed with each other. This makes it possible to keep a stable seal for a long term by an inner lip even though corrosion would be caused on the seal-contacting side face and an outer lip would be worn.

The sealing lips are formed as side lips inclined radially outward toward the outer side. Thus, they form a flared configuration toward their tips.

The annular metal member includes a disc-shaped portion to be closely contacted with the side face of the wheel mounting flange of the inner side. A cylindrical portion axially extends from an inner circumference of the disc-shaped portion toward the inner side. The sealing lips are formed as radial lips to contact the inner circumferential surface of the cylindrical portion of the annular metal member.

The backup seal is formed integrally with the outer side seal.

A radially inward sealing lip of the one pair of sealing lips is contacted with the annular metal member via an interference larger than that of a radially outward sealing lip. This makes it possible to suppress the rotational torque hampering action applied to the wheel mounting flange by the backup seals. Thus, this keeps a stable seal for a long term by the inner seal lip even though the outer seal lip may become worn.

The vehicle wheel bearing apparatus of the present disclosure includes an outer member formed, on its outer circumference, with a body mounting flange to be mounted on a suspension of a vehicle. Its inner circumference has double row outer raceway surfaces. An inner member includes a wheel hub formed, on one end, with a wheel mounting flange. Its outer circumference includes a cylindrical portion. An inner ring or an outer joint member of a constant velocity universal joint is press-fit onto the wheel hub. Its outer circumference is formed with inner raceway surfaces that are arranged opposite to the double row outer raceway surfaces. Double row rolling elements are freely rollably held by cages between the outer and inner raceway surfaces of the outer and inner members. Seals are mounted within annular openings formed between the outer and the inner members. A backup seal is arranged radially outward of an outer side seal of the seals. The backup seal includes a sealing lip inclined radially outward toward the outer side. The sealing lip is in sliding contact with an annular metal member, pressed from a steel sheet having preservation properties. The metal member is bolted on a side face of the wheel mounting flange of the inner side. The vehicle wheel bearing apparatus eliminates finishing, to a predetermined surface roughness, of the side face of the inner side of the wheel mounting flange that the side lip sliding contacts. Thus, it can improve the sealability while keeping an excellent sealing contact surface. This keeps a good bearing performance for a long term.

A vehicle wheel bearing apparatus comprises a wheel hub formed, on one end, with a wheel mounting flange. Its outer circumference has a cylindrical portion axially extending from the wheel mounting flange. A wheel bearing is press fit onto the cylindrical portion. The wheel bearing includes an outer member formed, on its outer circumference, with a body mounting flange to be mounted on a suspension of a vehicle. Its inner circumference includes double row outer raceway surfaces. A pair of inner rings is formed, on its outer circumference, with inner raceway surfaces that are arranged opposite to the double row outer raceway surfaces. Double row rolling elements are freely rollably held by cages between the outer and inner raceway surfaces of the outer and inner members. Seals are mounted within annular openings formed between the outer and the inner members. The wheel bearing is axially immovably secured by a caulked portion formed by plastically, radially outward, deforming the end of the cylindrical portion. A backup seal is mounted on the circumference of the outer side end of the outer member. The backup seal includes a sealing lip inclined radially outward toward the outer side. The sealing lip slidingly contacts an annular metal member that is pressed from a steel sheet having preservation properties. The annular metal member is formed on its outer circumference with an axially extending cylindrical portion that is fit onto the outer circumference of the wheel mounting flange. The annular metal member is secured on a side face of the wheel mounting flange of the inner side by hub bolts mounted on the wheel mounting flange.

Further areas of applicability will become apparent from the description provided herein. The description and specific examples in this summary are intended for purposes of illustration only and are not intended to limit the scope of the present disclosure.

DRAWINGS

FIG. 1 is a longitudinal section view of a first embodiment of the vehicle wheel bearing apparatus.

FIG. 2 is a partially enlarged view of FIG. 1.

FIG. 3 is a front elevation view of an annular metal member.

FIG. 4 is a front elevation view of the wheel bearing apparatus.

FIG. 5 is a partially enlarged longitudinal section view of a second embodiment of the wheel bearing apparatus.

FIG. 6 is a front elevation view of a modification of the annular metal member of FIG. 5.

FIG. 7 is a front elevation view of the wheel bearing apparatus provided with the annular metal member of FIG. 6.

FIG. 8 is a front elevation view of another modification of the annular metal member of FIG. 6.

FIG. 9 is a front elevation view of the wheel bearing apparatus provided with the annular metal member of FIG. 8.

FIG. 10 is a longitudinal section view of a third embodiment of the vehicle wheel bearing apparatus.

FIG. 11 is a partially enlarged view of FIG. 10.

FIG. 12 is a front elevation view of an annular metal member of FIG. 10.

FIG. 13 is a front elevation view of the wheel bearing apparatus of FIG. 10.

FIG. 14 is a front elevation view of a modification of the annular metal member of FIG. 12.

FIG. 15 is a front elevation view of the wheel bearing apparatus provided with the annular metal member of FIG. 14.

FIG. 16 is a front elevation view of another modification of the annular metal member of FIG. 12.

FIG. 17 is a front elevation view of the wheel bearing apparatus provided with the annular metal member of FIG. 16.

FIG. 18 is a longitudinal section view of a fourth embodiment of the vehicle wheel bearing apparatus.

FIG. 19 is a partially enlarged view of FIG. 18.

FIG. 20 is a longitudinal section view of a fifth embodiment of the vehicle wheel bearing apparatus.

FIG. 21 is a partially enlarged view of FIG. 20.

FIG. 22 is a longitudinal section view of a sixth embodiment of the vehicle wheel bearing apparatus.

FIG. 23 is a longitudinal section view of a prior art vehicle wheel bearing apparatus.

FIG. 24 is a partially enlarged view of FIG. 23.

DETAILED DESCRIPTION

Preferable embodiments of the present disclosure will be hereinafter described with reference to the drawings.

FIG. 1 is a longitudinal section view of a first embodiment of the vehicle wheel bearing apparatus. FIG. 2 is a partially enlarged view of FIG. 1. FIG. 3 is a front elevation view of the annular metal member. FIG. 4 is a front elevation view of the vehicle wheel bearing apparatus. In the description below, the term "outer side" of the wheel bearing apparatus denotes a side positioned outside of the vehicle body when the wheel bearing apparatus is mounted on a vehicle (left-hand side in drawings). The term "inner side" denotes a side positioned inside of the vehicle body (right-hand side in drawings).

The wheel bearing apparatus is a second generation type used for a driving wheel and includes a wheel hub 1 and a wheel bearing 2. The wheel bearing 2 includes an outer member 3 and a pair of inner rings 5, 5 fit onto the wheel hub 1 via double row rolling elements (tapered rollers) 4, 4.

The wheel hub 1 has, on its one end, a wheel mounting flange 6 for mounting a wheel (not shown). A cylindrical portion 1a axially extends from the wheel mounting flange 6. The wheel hub 1 inner circumference has a serration (or spline) 1b. Hub bolts 6a are equidistantly mounted on the wheel mounting flange 6 along its periphery. The wheel bearing 2 is press fit onto the cylindrical portion 1a via a predetermined interference. It is axially immovably secured relative to the wheel hub 1 by a caulked portion 1c. The caulked portion is formed by plastically deforming, radially outwardly, the end of the cylindrical portion 1a.

The wheel hub 1 is made of medium carbon steel including carbon of 0.40~0.80% by weight such as S53C. It is hardened by high frequency induction quenching so that a region from a flange base 6b through a shoulder to the cylindrical portion 1b has a surface hardness of 58~64 HRC. Accordingly, the wheel hub 1 has a sufficient mechanical strength against rotary bending loads applied to the wheel mounting flange 6. The anti-fretting strength of the cylindrical portion 1a, on which inner rings 5, 5 are fit, is improved.

The outer member 3 of the wheel bearing 2 is integrally formed, on its outer circumference, with a body mounting flange 3b to be mounted on a knuckle (not shown). Its inner circumference is formed with double row outer raceway surfaces 3a, 3a each diverging outward. The outer member 3 is made of medium carbon steel including carbon of 0.40~0.80% by weight such as S53C. The double row outer raceway surfaces 3a, 3a are hardened by high frequency induction quenching to have a surface hardness of 58~4 HRC.

Each inner ring 5 is formed on its outer circumference with an inner raceway surface 5a that is arranged opposite to one of the double row outer raceway surfaces 3a, 3a. A larger flange 5b, guiding the tapered rollers 4, is formed in the inner rings. A smaller flange 5c is formed at its smaller diameter side to prevent falling out of the tapered rollers 4. The inner rings 5, 5 and rolling elements 4 are made of high carbon chrome steel such as SUJ2. They are hardened to their core by dip quenching to having a hardness of 58~64 HRC. A plurality of rolling elements 4, 4 are contained between the outer and inner raceway surfaces of the outer member 3 and the pair of inner rings 5, 5. The rolling elements 4, 4 are freely rollably held by cages 7, 7. The wheel bearing 2 is a so-called back-to-back double row tapered roller bearing. The bearing 2 abuts against the shoulder 1d of the wheel hub 1. The smaller flanges 5c of the two inner rings 5 abut against each other.

Seals 8, 8 are mounted within annular openings formed between the outer member 3 and inner rings 5. The seals 8, 8 prevent leakage of grease contained in the bearing and prevent the entry of rain water and dusts into the bearing from the outside. As shown in the enlarged view of FIG. 2, each seal 8 includes a so-called pack seal that includes an annular sealing plate 9 and a slinger 10 each having an L-shaped cross section and arranged opposite to each other. The sealing plate 9 includes a metal core 11 fit into the end of the outer member 3. A sealing member 12 is integrally adhered to the metal core 11 via vulcanized adhesion. The metal core 11 is made of austenitic-stainless steel sheet (JIS SUS 304 etc.) or preserved cold rolled steel sheet (JIS SPCC etc.) and formed with a generally L-shaped cross-section by a press process.

The slinger 10 is made of austenitic-stainless steel sheet (JIS SUS 304 etc.) or preserved cold rolled steel sheet (JIS SPCC etc.). It is formed with a generally L-shaped cross-section by a press process. It includes a cylindrical portion 10a press fit onto the larger flange 5b of the inner ring 5. An upstanding portion 10b extends radially outwardly from the cylindrical portion 10a. A pair of side lips 12a, 12b, integrally formed with the sealing member 12, is in sliding contact with the upstanding portion 10b of the slinger 10. A radial lip 12c is in sliding contact with the cylindrical portion 10a.

A backup seal 13 is provided in addition to the pair of seals 8, 8. The backup seal 13 is press fit onto the outer circumference of the end of the outer member 3. The backup seal 13 includes a metal core 14 and a sealing member 15 integrally adhered to the metal core 14, via vulcanized adhesion. The metal core 14 is made of austenitic-stainless steel sheet (JIS SUS 304 etc.) or preserved cold rolled steel sheet (JIS SPCC etc.). It is formed with a generally L-shaped cross-section by a press process. The sealing member 15 includes a base portion 15a secured on the outer circumferential edge of the metal core 14. A side lip 15b extends radially outward from the base portion 15a and is inclined to form a flared configuration. The side lip 15b is in sliding contact with an annular metal member 16 mounted on the inner side surface 6c of the wheel mounting flange 6. The backup seal 13 prevents rain water or dusts from entering into the seal 8. Accordingly, it is possible to prevent rain water or dusts from collecting in an annular space between the wheel hub 1 and the wheel bearing 2. Also, it prevents the generation of corrosion on the base portion 6b of the wheel mounting flange 6 and a reduction of its strength.

The annular metal member 16 is made of austenitic-stainless steel sheet (JIS SUS 304 etc.) or preserved cold rolled steel sheet (JIS SPCC etc.). It is formed by a press process and secured on the wheel mounting flange 6 by being sandwiched by hub bolts 6a. It may be possible to secure the annular metal member 16 using a packing (not shown) to increase closeness of the annular plate 16 relative to the inner side surface 6c of the wheel mounting flange 6.

The annular metal member 16 has a generally disc shaped configuration provided with a cylindrical portion 16a. The cylindrical portion 16a axially extends toward the outer side. The outer circumference has a substantially L-shaped cross-section and is finished to have a predetermined surface hardness and roughness. The cylindrical portion 16a is adapted to be fit onto the outer circumference of the wheel mounting flange 6. Accordingly, the cylindrical portion 16a prevents rain water from entering into the inside of the annular metal member 16. Thus, this improves the sealability while keeping an excellent sealing contact surface. Thus, it keeps a good bearing performance for a long term.

The cylindrical portion 16a of the annular metal portion 16 is interference fit onto the outer circumference of the wheel mounting flange 6. This makes it possible to easily mount the annular metal member 16 on the wheel mounting flange 6 during assembly of the wheel bearing assembly. In addition, a clearance exists between the end of the cylindrical portion 16a of the annular metal member 16 and the side face of the outer side (side at which a wheel is mounted) of the wheel mounting flange as shown by "t" in FIG. 2. This eliminates interference between the annular metal member and a wheel of the vehicle.

As shown in FIG. 3, the annular metal member 16 is formed with six bolt inserting apertures 17 equidistantly spaced with respect to each other along the periphery. The side lip 15b of the backup seal 13 slidingly contacts the annular metal member 16 as shown by a phantom line in FIG. 3 and a solid line in FIG. 4.

Although it is illustrated as a second generation type for a driving wheel, it should be noted that the present disclosure may be applied to a third or fourth generation type and also to a driven wheel. In addition, although it is shown with a double row tapered roller bearing, the present disclosure may be applied to a double row angular contact ball bearing.

A second embodiment of the wheel bearing apparatus of the present disclosure will be described. FIG. 5 is a partially enlarged longitudinal section view of a second embodiment of the wheel bearing apparatus. This embodiment is different from the first embodiment only in the structure of the annular metal member and a part of the wheel mounting flange. Accordingly, the same reference numerals as those used in the previous embodiment are also used in this modification and detailed descriptions to the same parts will be omitted.

In this embodiment, a shallow stepped recess 6d is formed on the outer circumference of the wheel mounting flange 6. The cylindrical portion 18a of the annular metal member 18 is fit into the stepped recess 6d. The length of the cylindrical portion 18a is shorter than that of the cylindrical portion 16a of the first embodiment. The end of the cylindrical portion 18a extends near the end of the stepped recess 6d. As the cylindrical portion 18a of the annular metal member 18 is fit into the stepped recess 6d of the wheel mounting flange 6, it is possible to avoid interference between the annular metal member 18 and parts of the brake, etc.

FIG. 6 is a front elevation view of an annular metal member 19 that is a modification of the annular metal member of FIG. 5. FIG. 7 is a front elevation view of the wheel bearing apparatus provided with the annular metal member 19 of FIG. 6. This embodiment is different from the first embodiment only in the structure of the annular metal member and a part of the wheel mounting flange. The same reference numerals as those used in the previous embodiment are also used in this modification and detailed descriptions as to the same parts will be omitted.

As shown in FIG. 6, the annular metal member 19 is formed with six elongated bolt insertion apertures 20 equidistantly spaced with respect to each other along a periphery. The elongated apertures 20 enables easy positioning between these apertures 20 and the apertures of the hub bolts 6*a* of the wheel mounting flange 6. Thus, easy insertion of hub bolts 6*a* occurs. The side lip 15*b* of the backup seal 13 can slidingly contact the annular metal member 19 as shown in FIG. 7.

FIG. 8 is a front elevation view of another modification of the annular metal member of FIG. 6. FIG. 9 is a front elevation view of the wheel bearing apparatus provided with the annular metal member of FIG. 8. The same reference numerals as those used in the previous embodiment are also used in this modification and detailed descriptions as to the same parts will be omitted.

An annular metal member 21 shown in FIG. 8 is formed with two bolt insertion apertures 22 equidistantly spaced with respect to each other. Each of these bolt insertion apertures 22 has a long opening formed by connecting three elongated apertures 20 of FIG. 6. The bolt insertion apertures 22 each have a very long opening that enables easy positioning of the annular metal member 21 during assembly. The side lip 15*b* of the backup seal 13 can slidingly contact the annular metal member 21 as shown in FIG. 9.

FIG. 10 is a longitudinal section view of a third embodiment of the vehicle wheel bearing apparatus. FIG. 11 is a partially enlarged view of FIG. 10. FIG. 12 is a front elevation view of an annular metal member of FIG. 10. FIG. 13 is a front elevation view of the wheel bearing apparatus of FIG. 10. This embodiment is different from previous embodiments (FIGS. 1 and 5) only in the structure of the annular metal member and a part of the wheel mounting flange. The same reference numerals as those used in the previous embodiments are also used in this modification and detailed descriptions as to the same parts will be omitted.

In this embodiment, in addition to the pair of seals 8, 8, a backup seal 13 is press fit onto the outer circumference of the end of the outer member 3. The backup seal 13 includes a metal core 14 and a sealing member 15 integrally adhered to the metal core 14 via vulcanized adhesion. The side lip 15*b* slidingly contacts an annular metal member 23 mounted on the inner side surface 6*c* of the wheel mounting flange 6. The backup seal 13 prevents rain water or dusts from entering to the seal 8. Accordingly, it is possible to prevent rain water or dusts from collecting in an annular space between the wheel hub 1 and the wheel bearing 2. Also, it prevents the generation of corrosion on the base portion 6*b* of the wheel mounting flange 6 and a reduction of its strength.

The annular metal member 23 is made of austenitic-stainless steel sheet (JIS SUS 304 etc.) or preserved cold rolled steel sheet (JIS SPCC etc.). It is formed by a press process and is adapted to be secured on the wheel mounting flange by the hub bolts 6*a* in a sandwiched fashion.

The annular metal member 23 has a generally disc shaped configuration. A cylindrical portion 23*a* axially extends toward the inner side at its outer circumference. It has a substantially L-shaped cross-section and is finished to have a predetermined surface hardness and roughness, as shown in the enlarged view of FIG. 11. The annular metal member 23 is secured on the wheel mounting flange 6 with an interposed packing 24. This increases the bonding strength against the side face 6*c* of the inner side of the wheel mounting flange 6. The outer circumference of the wheel mounting flange 6 is formed with a projection. A cylindrical portion 6*e* axially extends toward the inner side. The outer circumference of the cylindrical portion 23*a* of the annular metal member 23 is fit into the inner circumference of the cylindrical portion 6*e* of the wheel mounting flange 6, via an interference fit. The interference fit between the cylindrical portions 6*e* and 23*a*, respectively, of the wheel mounting flange 6 and the annular metal member 23 makes it possible to provide a wheel bearing apparatus that prevents rain water from entering into the inside of the annular metal member 23. Thus, it improves the sealability of the seal 8 while keeping an excellent sealing contact surface. Thus, this keeps a good bearing performance for a long term. Furthermore, the interference fit between the cylindrical portions 6*e* and 23*a* holds the annular metal member 23 on the wheel mounting flange 6. Thus, this improves workability of the mounting of the hub bolts during assembly and service.

As shown in FIG. 12, the annular metal member 23 is formed with six bolt inserting apertures 17 equidistantly spaced with respect to each other along the periphery. The side lip 15*b* of the backup seal 13 slidingly contacts the annular metal member 23 as shown in a phantom line in FIG. 12 and a solid line in FIG. 13.

FIG. 14 is a front elevation view of a modification of the annular metal member 23. FIG. 15 is a front elevation view of the wheel bearing apparatus provided with the annular metal member 25 of FIG. 14. The same reference numerals as those used in the previous embodiment are also used in this modification and detailed descriptions as to the same parts will be omitted.

As shown in FIG. 14, the annular metal member 25 is formed with six elongated bolt insertion apertures 26 equidistantly spaced with respect to each other along a periphery. The elongated apertures 26 enables easy positioning between these apertures 26 and the apertures for hub bolts 6*a* of the wheel mounting flange 6 and thus easy insertion of hub bolts 6*a*. The side lip 15*b* of the backup seal 13 can slidingly contact the annular metal member 25 as shown in FIG. 15.

FIG. 16 is a front elevation view of another modification of the annular metal member 23. FIG. 17 is a front elevation view of the wheel bearing apparatus provided with the modified annular metal member of FIG. 16. The same reference numerals as those used in the previous embodiment are also used in this modification and detailed descriptions as to the same parts will be omitted.

An annular metal member 27 shown in FIG. 16 is formed with two bolt insertion apertures 28 equidistantly spaced with respect to each other. Each of these bolt insertion apertures 28 has a long opening formed by connecting three elongated apertures 26 of FIG. 12. The bolt insertion apertures 28 each have a very long opening to enable easy positioning of the annular metal member 27 during assembly. The side lip 15*b* of the backup seal 13 can slidingly contact the annular metal member 27 as shown in FIG. 17.

FIG. 18 is a longitudinal section view of a fourth embodiment of the vehicle wheel bearing apparatus. FIG. 19 is a partially enlarged view of FIG. 18. This embodiment is different from the first embodiment (FIG. 1) only in the structure of the backup seal. The same reference numerals as those used in the previous embodiments are also used in this modification and detailed descriptions as to the same parts will be omitted.

In this embodiment, seals 8, 8 are arranged in annular openings formed between the outer member 3 and the inner rings 5. The seals 8, 8 prevent leakage of grease contained within the bearing and entry of rain water and dusts into the bearing from the outside. A backup seal 29 is press fit onto the outer circumference of the end of the outer member 3. As shown in the enlarged view of FIG. 19, the backup seal 29 includes a metal core 30 press fit onto the outer circumference of the outer side end of the outer member 3. A sealing member 31 is integrally adhered to the metal core 30 via vulcanized adhesion. The metal core 30 is made of austenitic-stainless steel sheet (JIS SUS 304 etc.) or preserved cold rolled steel sheet (JIS SPCC etc.). It is formed with a generally L-shaped cross-section by a press process.

The sealing member 31 includes a secured portion 31a secured on the metal core 30. A pair of side lips 31b, 31c radially outwardly extend from the secured portion 31a. The side lips 31b, 31c are inclined to form a flared configuration. The side lips 31b, 31c directly contact the side face 6c of the inner side of the wheel mounting flange 6. They prevent rainwater or dusts etc. from direct entry into the seal 8. A radially inward sealing lip 31c of the one pair of sealing lips 31b, 31c is in contact with the wheel mounting flange 6, via an interference larger than that of the radially outward sealing lip 31b. This makes it possible to suppress rain water or dusts from collecting in a small annular space between the wheel hub 1 and the wheel bearing 2. It suppresses the generation of corrosion on the base portion 6b of the wheel mounting flange 6 and a reduction of its strength or durability. In addition it is possible to suppress the rotational torque hampering action applied to the wheel mounting flange by the backup seal 29. Also, it is possible to keep a stable seal for a long term by an inner side lip 31c although corrosion would be caused on the seal-contacting side face 6c and an outer side lip 31b would be worn.

FIG. 20 is a longitudinal section view of a fifth embodiment of the vehicle wheel bearing apparatus. FIG. 21 is a partially enlarged view of FIG. 20. This embodiment is different from the fourth embodiment (FIG. 18) only in the structure of the backup seal. Thus, the same reference numerals as those used in the previous embodiments are also used in this modification and detailed descriptions as to the same parts will be omitted.

This wheel bearing apparatus has the structure of a second generation type including a wheel hub 1 and a double row rolling bearing 2. The wheel hub 1 has, on its one end, a wheel mounting flange 32 for mounting a wheel (not shown). A cylindrical portion 1a axially extends from the wheel mounting flange 32.

Seals 35, 8 are arranged in annular openings formed between the outer member 3 and the inner rings 5. The seals 35, 8 prevent leakage of grease contained within the bearing and entry of rain water and dusts into the bearing from the outside.

An annular metal member 33, forming a seal contacting surface, is secured on the side face 6c of the inner side of the wheel mounting flange 32, via securing bolts 34. The annular metal member 33 is made of austenitic-stainless steel sheet (JIS SUS 304 etc.) or preserved cold rolled steel sheet (JIS SPCC etc.) and is formed by a press process. The annular metal member 33 is secured on the wheel mounting flange 32 with an interposed packing (not shown) in order to increase the bonding strength against the wheel mounting flange 32. The annular metal member 33 is finished to have a predetermined surface hardness and roughness.

The outer side seal 35 has a substantially L-shaped cross-section as shown in FIG. 21. It forms a pack seal with an annular sealing plate 36 and slinger 10 that are arranged oppositely facing each other. The outer side seal 35 is integrally formed with a backup seal 37 radially outward of the outer side seal 35. The sealing plate 36 includes a metal core 38 press fit into the inner circumference of the end of the outer member 3. A sealing member 12 is integrally adhered to the metal core 38 via vulcanized adhesion. The metal core 38 is made of austenitic-stainless steel sheet (JIS SUS 304 etc.) or preserved cold rolled steel sheet (JIS SPCC etc.) and is formed by a press process.

The sealing member 12 includes a pair of side lips 12a, 12b in sliding contact with a standing portion 10a of the slinger 10. A radial lip 12c is in sliding contact with a cylindrical portion 10a. The backup seal 37 extends radially outwardly and is integrally connected to the sealing member 12. The sealing member 12 is integrally adhered to the metal core 38 via vulcanized adhesion. It includes a pair of side lips 37a, 37b. The side lips 37a, 37b slidingly contact the annular metal member 33, via a predetermined interface, in order to prevent rain water or dusts etc. from directly entering into the pack seal portion. This suppresses rain water or dusts from collecting in a small annular space between the wheel hub 1 and the wheel bearing 2. It also suppresses the generation of corrosion on the base portion 6b of the wheel mounting flange 32 and a reduction of its strength or durability. In addition, it is possible to have a good seal contacting surface by only mounting the annular metal member 33 on the side face 6c of the wheel mounting flange 32 while suppressing wear of the side lips 37a, 37b. Furthermore, it also possible to keep a stable seal for a long term by an inner side lip 37b although the outer side lip 37a would be worn.

FIG. 22 is a longitudinal section view of a sixth embodiment of the vehicle wheel bearing apparatus. This embodiment is different from the fifth embodiment (FIG. 20) only in the structure of the backup seal and the annular metal member. Thus, the same reference numerals as those used in the previous embodiments are also used in this modification and detailed descriptions to the same parts will be omitted.

In this embodiment a backup seal 39 is press fit onto the outer circumference of the end of the outer member 3. An annular metal member 40, forming the sealing contact surface of the backup seal 39, is secured on the side face 6c of the wheel mounting flange 32. The backup seal 39 includes a metal core 41 press fit onto the outer circumference of the outer side end of the outer member 3. A sealing member 42 is integrally adhered to the metal core 41, via vulcanized adhesion. The metal core 41 is made of austenitic-stainless steel sheet (JIS SUS 304 etc.) or preserved cold rolled steel sheet (JIS SPCC etc.) and is formed by a press process.

The sealing member 42 includes a secured portion 42a secured on the metal core 41, and a pair of radial lips 42b, 42c that extends radially outwardly from the secured portion 42a. The lips 42b, 42c are inclined and arranged side by side in the axial direction. The radial lips 42b, 42c directly contact the annular metal member 40 and prevent rain water or dusts etc. from directly entering into the seal 8.

The annular metal member 40 is made of austenitic-stainless steel sheet (JIS SUS 304 etc.) or preserved cold rolled steel sheet (JIS SPCC etc.). It is formed by a press process to form a disc-shaped portion 40a and a cylindrical portion 40b that axially extends from the disc-shaped portion 40a. The radial lips 42b, 42c of the backup seal 39 slidingly contact the cylindrical portion 40b. Similarly to the annular metal member 33 (fifth embodiment), the annular metal member 40 is finished with a predetermined surface hardness and surface roughness. Thus, it is possible to have a good seal sliding contact surface while suppressing wear of the radial lips 42b, 42c.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus of the present disclosure can be applied to any of the bearing apparatus of the second, third or fourth generation irrespective of the driving wheel or the driven wheel.

What is claimed is:

1. A vehicle wheel bearing apparatus comprising:
an outer member formed, on its outer circumference, with a body mounting flange to be mounted on a suspension of a vehicle and on its inner circumference with double row outer raceway surfaces;
an inner member including a wheel hub formed, on its one end, with a wheel mounting flange and on its outer circumference with a cylindrical portion, an outer circumference of the wheel mounting flange is formed with a circumferential stepped recess, an inner ring or an outer joint member of a constant velocity universal joint press-fit onto the wheel hub and formed, on its outer circumference, with inner raceway surfaces arranged opposite to the double row outer raceway surfaces;
double row rolling elements freely rollably held by cages between the outer and inner raceway surfaces of the outer and inner members;
seals mounted within annular openings formed between the outer and the inner members;
a backup seal arranged radially outward of an outer side seal of said seals;
the backup seal comprises a sealing lip inclined radially outward toward the outer side; and
the sealing lip slidingly contacts an annular metal member, said annular metal member pressed from a steel sheet having preservation properties and is bolted on a side face of the wheel mounting flange of the inner side, the annular metal member is formed, on its outer circumference, with an axially extending cylindrical portion to be fit into the stepped recess on the outer circumference of the wheel mounting flange.

2. The vehicle wheel bearing apparatus of claim 1, wherein the annular metal member is finished so that it has a predetermined surface hardness and surface roughness.

3. The vehicle wheel bearing apparatus of claim 1, wherein an elastic member is interposed between the annular metal member and the wheel mounting flange.

4. The vehicle wheel bearing apparatus of claim 1, wherein the backup seal comprises a plurality of sealing lips.

5. The vehicle wheel bearing apparatus of claim 4, wherein the sealing lips are formed as side lips inclined radially outward towards the outer side so that they form a flared configuration toward their tips.

6. The vehicle wheel bearing apparatus of claim 4, wherein the annular metal member comprises a disc-shaped portion to be closely contacted with the side face of the wheel mounting flange of the inner side and a cylindrical portion axially extending from an inner circumference of the disc-shaped portion toward the inner side, and wherein the sealing lips are formed as radial lips to be contacted with the inner circumferential surface of the cylindrical portion of the annular metal member.

7. The vehicle wheel bearing apparatus of claim 4, wherein the backup seal is formed integrally with the outer side seal.

8. The vehicle wheel bearing apparatus of claim 4, wherein a radially inward sealing lip of said one pair of sealing lips is contacted with the annular metal member via an interference larger than that of a radially outward sealing lip.

9. A vehicle wheel bearing apparatus comprising:
an outer member formed, on its outer circumference, with a body mounting flange to be mounted on a suspension of a vehicle and on its inner circumference with double row outer raceway surfaces;
an inner member including a wheel hub formed, on its one end, with a wheel mounting flange and on its outer circumference with a cylindrical portion, an outer circumference of the wheel mounting flange is formed with a cylindrical portion axially extending toward the inner side, an inner ring or an outer joint member of a constant velocity universal joint press-fit onto the wheel hub and formed, on its outer circumference, with inner raceway surfaces arranged opposite to the double row outer raceway surfaces;
double row rolling elements freely rollably held by cages between the outer and inner raceway surfaces of the outer and inner members;
seals mounted within annular openings formed between the outer and the inner members;
a backup seal arranged radially outward of an outer side seal of said seals;
the backup seal comprises a sealing lip inclined radially outward toward the outer side; and
the sealing lip slidingly contacts an annular metal member, said annular metal member pressed from a steel sheet having preservation properties and is bolted on a side face of the wheel mounting flange of the inner sides, and a cylindrical portion of the annular metal member is fit into the mounting flange axially extending cylindrical portion.

10. The vehicle wheel bearing apparatus of claim 9, wherein the cylindrical portion of the annular metal member is interference fit onto the cylindrical portion of the wheel mounting flange.

11. The vehicle wheel bearing apparatus of claim 9, wherein the annular metal member is finished so that it has a predetermined surface hardness and surface roughness.

12. The vehicle wheel bearing apparatus of claim 9, wherein an elastic member is interposed between the annular metal member and the wheel mounting flange.

13. The vehicle wheel bearing apparatus of claim 9, wherein the backup seal comprises a plurality of sealing lips.

14. The vehicle wheel bearing apparatus of claim 13, wherein the sealing lips are formed as side lips inclined radially outward towards the outer side so that they form a flared configuration toward their tips.

15. The vehicle wheel bearing apparatus of claim 13, wherein the annular metal member comprises a disc-shaped portion to be closely contacted with the side face of the wheel mounting flange of the inner side and a cylindrical portion axially extending from an inner circumference of the disc-shaped portion toward the inner side, and wherein the sealing lips are formed as radial lips to be contacted with the inner circumferential surface of the cylindrical portion of the annular metal member.

16. The vehicle wheel bearing apparatus of claim 13, wherein the backup seal is formed integrally with the outer side seal.

17. The vehicle wheel bearing apparatus of claim 13, wherein a radially inward sealing lip of said one pair of sealing lips is contacted with the annular metal member via an interference larger than that of a radially outward sealing lip.

* * * * *